US008072458B2

(12) United States Patent
Takizawa et al.

(10) Patent No.: US 8,072,458 B2
(45) Date of Patent: Dec. 6, 2011

(54) STORAGE MEDIUM HAVING GAME PROGRAM STORED THEREON AND GAME APPARATUS

(75) Inventors: Satoru Takizawa, Kyoto (JP); Makoto Sasaki, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 1537 days.

(21) Appl. No.: 11/482,010

(22) Filed: Jul. 7, 2006

(65) Prior Publication Data

US 2007/0082742 A1 Apr. 12, 2007

(30) Foreign Application Priority Data

Oct. 11, 2005 (JP) ................................. 2005-296749

(51) Int. Cl.
  *G06T 13/00* (2006.01)
(52) U.S. Cl. ........................................................ 345/473
(58) Field of Classification Search .................. None
  See application file for complete search history.

(56) References Cited

U.S. PATENT DOCUMENTS 5,976,017 A * 11/1999 Omori et al. .................... 463/32
6,108,005 A * 8/2000 Starks et al. .................. 345/419
6,515,663 B1 * 2/2003 Hung et al. ................... 345/427
6,900,799 B2 * 5/2005 Takeuchi ...................... 345/419
7,720,308 B2 * 5/2010 Kitaura et al. ................ 382/285
2002/0180734 A1 * 12/2002 Endoh et al. .................. 345/428

FOREIGN PATENT DOCUMENTS

| JP | 11-039502 | 2/1999 |
| JP | 2001-175884 | 6/2001 |
| JP | 2002-170131 | 6/2002 |
| JP | 2004-167223 | 6/2004 |

OTHER PUBLICATIONS

Office Action for Japanese Application No. 2005-296749, mailed Feb. 4, 2011.

* cited by examiner

*Primary Examiner* — Said Broome
(74) *Attorney, Agent, or Firm* — Nixon & Vanderhye P.C.

(57) ABSTRACT

When a movement of a sight point of a virtual camera along a line of sight thereof in a virtual game space is completed, an image representing the virtual game space is taken by the virtual camera and the image is used as a reference image. At the same time, started is a measurement of elapsed time since the generation of the reference image. Next, shifted images are generated based on the reference image, and a shift width representing a space on a screen between the reference image and each of the shifted images is determined in accordance with the elapsed time. An image is generated such that each of the shifted images is displaced from a position of the reference image on the screen by the shift width in a predetermined direction and the generated image is displayed on the screen.

24 Claims, 31 Drawing Sheets

FIG. 25

| DISTANCE FROM VIRTUAL CAMERA TO SIGHT POINT | TIMER VALUE |
|---|---|
| 0~10 | 30 |
| 11~20 | 60 |
| 21~30 | 90 |
| 31~40 | 120 |
| ⋮ | ⋮ |

103

STORAGE MEDIUM HAVING GAME PROGRAM STORED THEREON AND GAME APPARATUS

CROSS REFERENCE OF RELATED APPLICATION

The disclosure of Japanese Patent Application No. 2005-296749 is incorporated herein by reference.

BACKGROUND OF THE INVENTION

1. Field of the Invention

The present invention relates to a storage medium having a game program stored thereon and a game apparatus, and more particularly to a rendering process for a background image in a virtual game space.

2. Description of the Background Art

In recent years, a three-dimensional game using a three-dimensional computer graphics technology has been widespread with a computer incorporated in a game system having an enhanced performance. In the three-dimensional game, objects of polygons such as a player object and topography objects are disposed in a three-dimensional game space so as to represent, on a three-dimensional game screen, a state of the game space seen from a predetermined point of view.

As a rendering method for rendering a background in a player's (virtual camera's) field of vision in a game for allowing the player to operate a player character in the aforementioned virtual space, the following method can be used. In the method, an α value is set for each pixel in accordance with a depth value (Z value) of the pixel of an original image rendered as a background. A blurred image corresponding to the original image is generated. The original image is combined with the blurred image based on the α value so as to render the combined image. This method is disclosed in, for example, Japanese Laid-Open Patent Publication No. 2001-175884 (hereinafter, referred to as Patent Document 1).

In the rendering method disclosed in Patent Document 1, a combination ratio between the original image and the blurred image can be changed against the depth value, whereby it is possible to represent a depth of field and the like. However, such a method fails in rendering, with reality, the background which quickly changes in accordance with the character being operated in the virtual space. Specifically, for example, when a person quickly turns backward, the background quickly changes, so that he or she cannot quickly focus his or her eyes in the real world. That is, he or she gradually focuses his or her eyes as time passes. Human eyes have such characteristics. However, the rendering method disclosed in Patent Document 1 is not based on such characteristics of human eyes. The combination ratio between the original image and the blurred image changes against only the depth value. Therefore, when the depth value is unchanged, the constant depth of field is used to render the background regardless of how the background is changed. Accordingly, the image lacks reality when seen with human eyes.

SUMMARY OF THE INVENTION

Therefore, an object of the present invention is to provide a storage medium having stored thereon a game program for enabling a background to be rendered in a virtual space with enhanced reality, and a game apparatus.

The present invention has the following features to attain the object mentioned above. The reference numerals, supplementary description and the like in the parentheses are provided to indicate the correspondence with the embodiment described later in order to aid in understanding the present invention and are not intended to limit, in any way, the scope of the present invention.

A first aspect of the present invention is directed to a storage medium having stored thereon a game program for generating a game image representing a state of a virtual world at intervals of a unit time and sequentially displaying the generated image on a display device (12), and the game program causes a computer to execute: a storage step (S23); a shift width setting step (S43); an images-to-be-combined generation step (S41, S42); a combination step (S5, S6); and a game image generation step (S7). The storage step stores, as a reference image, an image generated at a predetermined time. The shift width setting step sets a shift width which is gradually reduced to zero as a time passes from the predetermined time. The images-to-be-combined generation step generates, using the reference image, images to be combined. The combination step repeatedly generates a combined image by combining the reference image having been stored with the images to be combined, which are displaced by the shift width from the reference image having been stored, until the shift width is reduced to zero. The game image generation step generates the game image containing the combined image at intervals of the unit time.

A second aspect of the present invention is directed to a storage medium having stored thereon a game program for generating a game image representing a state of a virtual world at intervals of a unit time and sequentially displaying the generated image on a display device (12), and the game program causes a computer to execute: a storage step (S23); a combination ratio setting step (S51); an images-to-be-combined generation step (S41, S42); a combination step (S5, S6); and a game image generation step (S7). The storage step stores, as a reference image, an image generated at a predetermined time. The combination ratio setting step sets a combination ratio which is gradually reduced to zero as a time passes from the predetermined time. The images-to-be-combined generation step generates, using the reference image, images to be combined. The combination step repeatedly generates a combined image by combining the reference image having been stored with the images to be combined at the combination ratio, until the combination ratio is reduced to zero. The game image generation step generates the game image containing the combined image at intervals of the unit time. The combination ratio described above represents a ratio, of each of the images to be combined, to the combined image to be displayed as the game image. That is, when the combination ratio is 100%, the images to be combined account for 100% of the combined image, that is, the combined image consists of only the images to be combined. When the combination ratio is 0%, the combined image does not contain the images to be combined, and the reference image accounts for 100% of the combined image. That is, the combined image to be displayed as the game image is equivalent to the reference image.

In a third aspect based on the first or second aspect, the game program is operable to generate, as the game image representing the virtual world, a three-dimensional image seen from a virtual camera which is set in a three-dimensional virtual world having three-dimensional objects disposed therein. The storage step stores, as the reference image, an image generated when at least one of a movement of the virtual camera in the virtual world and a rotation thereof is stopped.

In a fourth aspect based on the third aspect, the game program causes the computer to execute a moving distance calculation step (S22) of calculating a moving distance over which a sight point of the virtual camera is moved in a predetermined time period, and a distance association setting step of setting one of an initial value of the shift width and an initial value of the combination ratio in accordance with the moving distance having been calculated.

In a fifth aspect based on the fourth aspect, the moving distance represents a distance over which the sight point is moved along a line of sight of the virtual camera.

In a sixth aspect based on the third aspect, the game program causes the computer to execute an operation acceptance step (S2) of accepting an operation of changing at least one of the movement of the virtual camera in the virtual world and the rotation thereof. Further, the storage step stores, as the reference image, an image generated when the virtual camera is stopped after the operation is accepted.

In a seventh aspect based on the third aspect, the game program causes the computer to further execute a moving distance calculation step (S22) of calculating a moving distance over which a sight point of the virtual camera is moved in a predetermined time period. Further, the storage step stores the reference image when the moving distance having been calculated has a value greater than a predetermined value.

In an eighth aspect based on the seventh aspect, the moving distance represents a distance over which the sight point is moved along a line of sight of the virtual camera.

In a ninth aspect based on the first aspect, the images-to-be-combined generation step generates images identical to the reference image as the images to be combined.

In a tenth aspect based on the first or second aspect, the images-to-be-combined generation step generates, as the images to be combined, blurred images by blurring the reference image.

In an eleventh aspect based on the first aspect, the images-to-be-combined generation step includes a blurred image generation step (S41, S42) of rendering the reference image in a rendering memory and generating, as the images to be combined, at least two blurred images of a first blurred image and a second blurred image by blurring the reference image. Further, the combination step includes: a first position calculation step (S43); a second position calculation step (S43); and a blurred image combination step (S44). The first position calculation step calculates a first position which is offset by the shift width from the reference image having been rendered in the rendering memory. The second position calculation step calculates a second position which is offset by the shift width from the reference image having been rendered in the rendering memory in a direction different from a direction of the first position. The blurred image combination step combines, with the reference image, the first blurred image disposed at the first position and the second blurred image disposed at the second position so as to generate the combined image.

In a twelfth aspect based on the first aspect, the shift width setting step includes a step of setting an initial value of the shift width in accordance with an environmental parameter for determining an environment of the virtual world.

In a thirteenth aspect based on the first aspect, the virtual world contains a player character operable by a player using an operation means. Further, the shift width setting step includes a step of setting an initial value of the shift width in accordance with a parameter for determining a state of the player character.

In a fourteenth aspect based on the first aspect, the shift width setting step determines values of the shift width such that the images-to-be-combined are vibrated so as to be eventually superimposed on the reference image as the time passes.

In a fifteenth aspect based on the first aspect, the shift width setting step includes a read step of reading the shift width having been preset, and a reduction step of reducing, at intervals of the unit time, the shift width having been read toward zero.

In a sixteenth aspect based on the first aspect, the game program causes the computer to further execute a combination ratio setting step of setting a combination ratio in accordance with a value of the shift width. Further, the combination step combines the reference image with the images to be combined at the combination ratio.

A seventeenth aspect of the present invention is directed to a game apparatus (14) for generating a game image representing a state of a virtual world at intervals of a unit time and sequentially displaying the generated image on a display device, and the game apparatus comprises: a storage section (34); a shift width setting section (22); an images-to-be-combined generation section (22); a combination section (22); and a game image generation section (24). The storage section stores, as a reference image, an image generated at a predetermined time. The shift width setting section sets a shift width which is gradually reduced to zero as a time passes from the predetermined time. The images-to-be-combined generation section generates, using the reference image, images to be combined. The combination section repeatedly generates a combined image by combining the reference image having been stored with the images to be combined, which are displaced by the shift width from the reference image having been stored, until the shift width is reduced to zero. The game image generation section generates the game image containing the combined image at intervals of the unit time.

An eighteenth aspect of the present invention is directed to a game apparatus (14) for generating a game image representing a state of a virtual world at intervals of a unit time and sequentially displaying the generated image on a display device, and the game apparatus comprises: a storage section (34); a combination ratio settings section (22); an images-to-be-combined generation section (22); a combination section (22); and a game image generation section (24). The storage section stores, as a reference image, an image generated at a predetermined time. The combination ratio setting section sets a combination ratio which is gradually reduced to zero as a time passes from the predetermined time. The images-to-be-combined generation section generates, using the reference image, images to be combined. The combination section repeatedly generates a combined image by combining the reference image having been stored with the images to be combined at the combination ratio, until the combination ratio is reduced to zero. The game image generation section generates the game image containing the combined image at intervals of the unit time.

According to the first aspect, an image can be displayed such that images each of which is displaced from the reference image by a predetermined width gradually approach a position of the reference image as the time passes. Therefore, human eyes' characteristics that a blurred image gradually becomes distinctly visible when, for example, a focus is changed, can be represented on a game screen, thereby providing a player with the game having enhanced reality. Further, it is unnecessary to calculate a distance between each object and a virtual camera so as to provide an effective screen display. Therefore, the image processing is relatively simple, thereby reducing processing load and easily providing the game having enhanced reality.

According to the second aspect, an image can be displayed such that the images to be combined, which are generated based on the reference image, are gradually transformed to the reference image as the time passes. Therefore, the human eyes' characteristics that a blurred image gradually becomes distinctly visible as the time passes when a focus is changed, can be represented on a game screen, thereby providing a player with the game having enhanced reality.

According to the third aspect, an image is displayed such that, at a time when an operation of moving or changing a point of view in the virtual game space is performed, an image, which is blurred when the focus is changed, starts to gradually become distinctly visible. Therefore, the human eyes' characteristics can be naturally represented on the game screen, thereby providing the game having enhanced reality.

According to the fourth and the fifth aspects, an image is displayed such that, when the point of view is suddenly moved, a blurred image gradually becomes distinctly visible. Therefore, the human eyes' characteristics can be realistically represented on the game screen, thereby providing the game having enhanced reality.

According to the sixth aspect, an image is displayed such that, at a time when an operation of moving or changing a point of view in the virtual game space is performed, an image, which is blurred when the focus is changed, starts to gradually become distinctly visible. Therefore, the human eyes' characteristics can be naturally represented on the game screen, thereby providing the game having enhanced reality.

According to the seventh and the eighth aspects, an image is displayed such that, only when the sight point is moved over a long distance toward the point of view in the virtual game space, a blurred image gradually becomes distinctly visible. That is, the image is displayed in the virtual game space in the following manners. When a player character looking at a nearby area suddenly looks in the distance, its eyes cannot be quickly focused, and therefore an image is displayed such that a blurred image gradually becomes distinctly visible. On the other hand, when the player character looks at the nearby area, its eyes can be easily focused, and therefore the process for enabling a blurred image to gradually become distinctly visible is not performed. Thus, the rendering processes are performed in various manners. Accordingly, the human eyes' characteristics can be realistically represented, thereby providing the game having enhanced reality.

According to the ninth aspect, images identical to the reference image are used as the images to be combined, thereby simplifying the process of generating the images to be combined. Therefore, in the simplified process, the human eyes' characteristics that a blurred image gradually becomes distinctly visible when, for example, the focus is changed can be represented on the game screen.

According to the tenth and the eleventh aspects, since blurred images are used as the images to be combined, the human eyes' characteristics that a blurred image gradually becomes distinctly visible when, for example, the focus is suddenly changed can be represented on the game screen, thereby providing a player with the game having enhanced reality. Further, it is unnecessary to calculate the distance between each object and the virtual camera so as to provide an effective screen display. Only a simplified process of adjusting the combination ratio of each of the blurred images to the reference image may be performed. Therefore, the processing load can be reduced and the game having enhanced reality can be easily provided.

According to the twelfth and thirteenth aspects, an initial value of the shift width, which is used for representing an image such that a blurred image gradually becomes distinctly visible, can be set in accordance with a parameter and the like relating to a game content. Therefore, the shift width can be set in accordance with the game content and progress, thereby effectively realizing the representation with enhanced reality.

According to the fourteenth aspect, the shift width is determined such that the shifted images are vibrated so as to gradually attenuate the vibration to zero, whereby the human eyes' characteristics that a blurred image gradually becomes distinctly visible can be represented with increasingly enhanced reality.

According to the fifteenth aspect, the human eyes' characteristics that a blurred image gradually becomes distinctly visible when the focus is changed can be represented.

According to the sixteenth aspect, the combination ratio can be changed against the shift width. Therefore, an image can be displayed such that a blurred image gradually becomes distinctly visible in various manners.

Further, the game apparatus according to the present invention can realize the same effects as those of the first and the second aspects.

These and other objects, features, aspects and advantages of the present invention will become more apparent from the following detailed description of the present invention when taken in conjunction with the accompanying drawings.

BRIEF DESCRIPTION OF THE DRAWINGS

FIG. 25 shows an example of a timer setting table;

DESCRIPTION OF THE PREFERRED EMBODIMENTS

Hereinafter, an embodiment of the present invention will be described with reference to the drawings. It should be understood that the present invention is not restricted to the embodiment described below.

Figure 1:
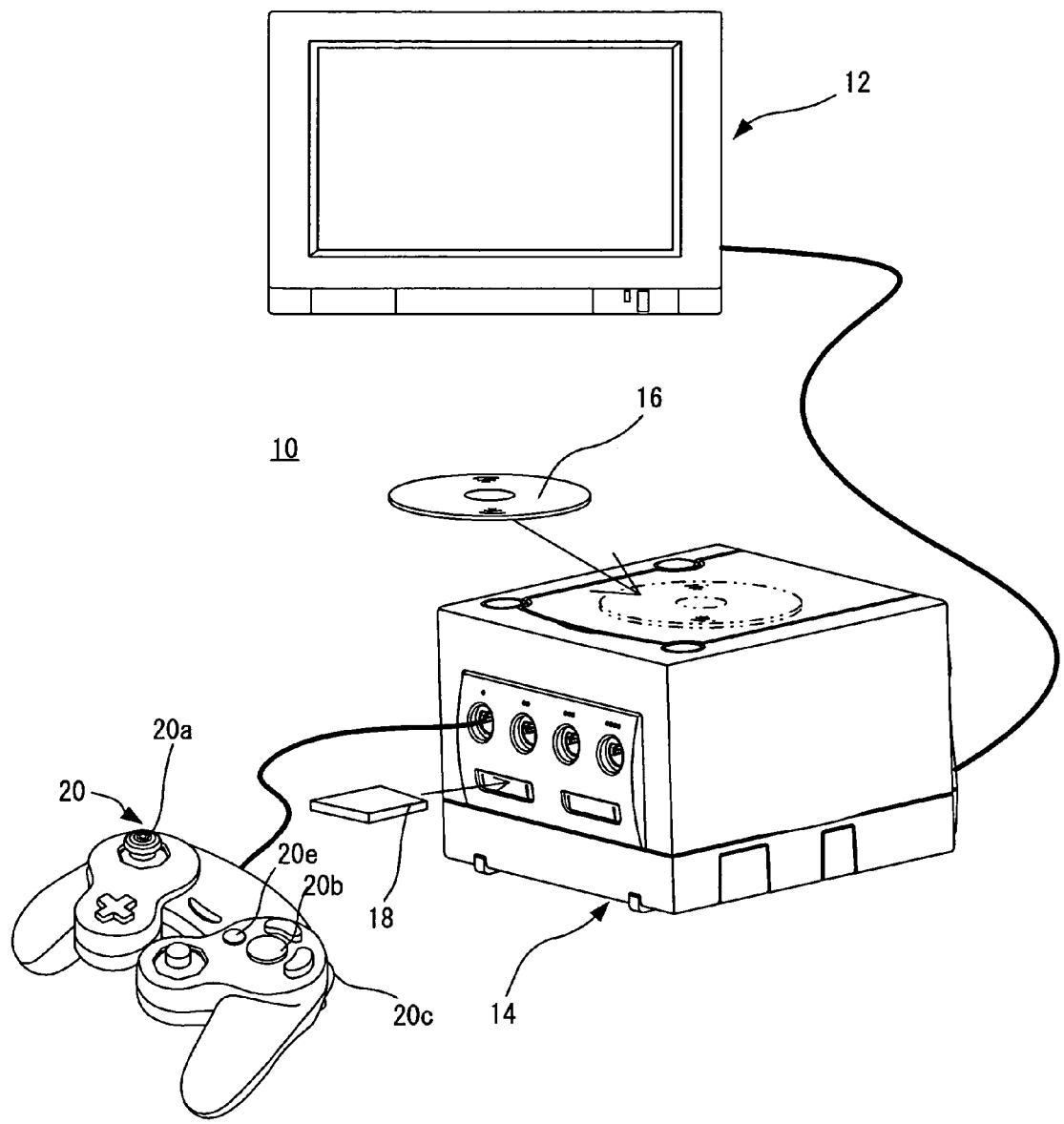
FIG. 1 is an external view illustrating a structure of a game system according to an embodiment of the present invention.
Figure 2:
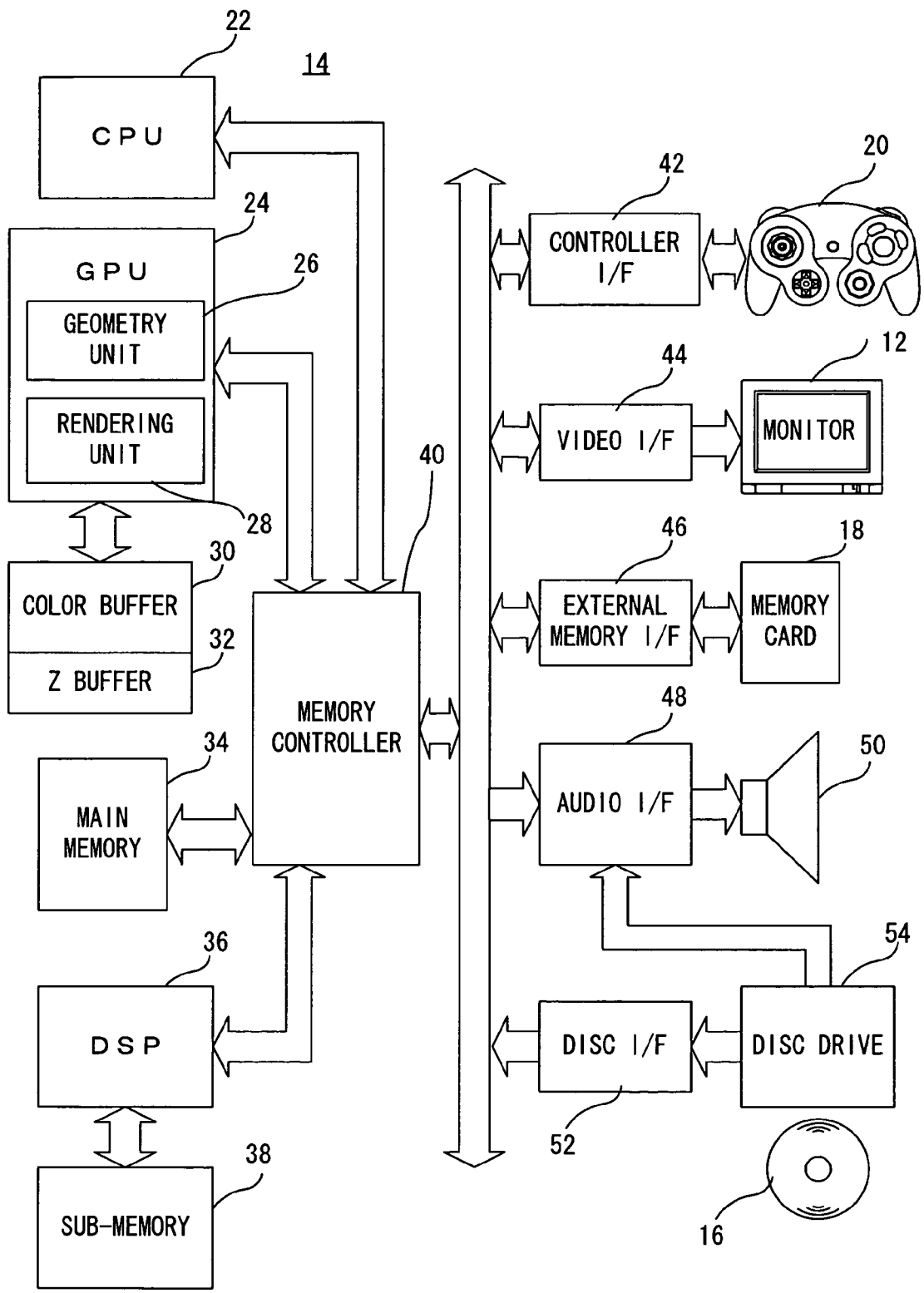
FIG. 2 is a block diagram of a game system shown in FIG. 1.

FIG. 1 is an external view illustrating a structure of a game system according to one embodiment of the present invention, and FIG. 2 is a block diagram of the game system shown in FIG. 1. As shown in FIGS. 1 and 2, the game system includes a game apparatus 14, an optical disc 16, a memory card 18, a controller 20, and a television set 12 having a speaker 50 shown in FIG. 2. The optical disc 16 and the memory card 18 are detachably mounted on the game apparatus 14. The controller 20 is connected to one of a plurality (for example, four as shown in FIG. 1) of controller port connectors of the game apparatus 14. The controller 20 has a plurality of operation sections such as a joystick 20a, an A button 20b, an R button 20c, a B button 20e, and a Z button not shown. According to another embodiment, the controller 20 may wirelessly communicate with the game apparatus 14, that is, no communication cable is used in this case. The television set 12 and the speaker 50 are connected to the game apparatus 14 via an AV cable and the like. While FIG. 1 shows that a stationary game apparatus is used, a hand-held game apparatus, an arcade game apparatus, an apparatus such as a mobile telephone or a personal computer capable of executing a game, can be also used for the present invention. Hereinafter, with reference to FIG. 2, respective components and a typical operation of the game system according to the present invention will be described in detail.

The optical disc 16 such as a DVD-ROM is used as an example of an external storage medium. The optical disc 16 fixedly stores a game program, and data, such as character data, relating to a game. When a player plays the game, the optical disc 16 is mounted on the game apparatus 14. A means for storing the game program and the like is not restricted to a DVD-ROM. The means for storing the game program and the like may be a storage medium such as a CD-ROM, an MO, a memory card, or a ROM cartridge. Alternatively, a game program downloaded through communication may be stored in a storage means such as a memory or a hard disk incorporated in the game apparatus. The memory card 18 is, for example, a rewritable storage medium such as a flash memory. The memory card 18 stores data such as saved data for a game.

The game apparatus 14 reads the game program stored in the optical disc 16 so as to perform a game process. The controller 20 is an input device used for a player to make an input for game play, and has the joystick and a plurality of operation switches as described above. The controller 20 outputs operation data to the game apparatus 14 in accordance with, for example, a player operating the joystick and pressing the operation switch. The television set 12 displays, on a screen, image data outputted by the game apparatus 14. The speaker 50, which is typically incorporated in the television set 12, outputs sound for a game outputted by the game apparatus 14. When two or more players play the game, the number of the controllers 20 provided is the same as the number of the players.

Next, a structure of the game apparatus 14 will be described. As shown in FIG. 2, the game apparatus 14 includes a CPU 22 and a memory controller 40 connected to the CPU 22. Further, in the game apparatus 14, the memory controller 40 is connected to a graphics processing unit (GPU) 24, a main memory 34, a digital signal processing circuit (DSP) 36, and various interfaces (I/Fs) 42 to 52. Via the DSP 36, the memory controller 40 is connected to a sub-memory 38. The memory controller 40 controls data transfer among the respective components.

At the start of a game, a disc drive 54 initially drives the optical disc 16 mounted on the game apparatus 14. The game program stored on the optical disc 16 is loaded to the main memory 34 via a disc I/F 52 and the memory controller 40. When the CPU 22 executes the program on the main memory 34, the game is started. After the game is started, a player makes an input to the controller 20 for game play using the joystick and the operation switches. In accordance with the input having been made by the player, the controller 20 outputs operation data to the game apparatus 14. The operation data outputted by the controller 20 is inputted to the CPU 22 via a controller I/F 42 and the memory controller 40. The CPU 22 is operable to perform a game process in accordance with the operation data having been inputted thereto. When generating image data and the like during the game process, the GPU 24 and the DSP 36 are used. Further, the sub-memory 38 is used when the DSP 36 performs a predetermined process.

The GPU 24 includes a geometry unit 26 and a rendering unit 28, and is connected to a memory dedicated to image processing. The memory dedicated to image processing is used as, for example, a color buffer 30 and a Z buffer 32. The geometry unit 26 performs calculation for coordinates of a solid model of an object and a graphic in a game space representing a virtual three-dimensional space (for example, a solid model of an object of a polygon). For example, the geometry unit 26 rotates, enlarges, downsizes, and transforms the solid model, and further converts coordinates in a world coordinate system into coordinates in a viewpoint coordinate system or into coordinates in a screen coordinate system. The rendering unit 28 writes, for each pixel, color data (RGB data) of the solid model projected on the screen coordinate system into the color buffer 30 based on a predetermined texture, thereby generating a game image. Further, the color buffer 30 is a memory area allocated so as to store game image data (RGB data) generated by the rendering unit 28. The Z buffer 32 is a memory area allocated so as to store, when the three-dimensional viewpoint coordinates are converted into two-dimensional screen coordinates, information of the depth dimension as seen from the viewpoint. The GPU 24 generates image data to be displayed on the television set 12 using the geometry unit 26, the rendering unit 28, the color buffer 30, and the Z buffer 32, and outputs the generated image data to the television set 12 via the memory controller 40 and a video I/F 44 as necessary. Sound data generated by the CPU 22 at the execution of the game program is outputted from the memory controller 40 to the speaker 50 via an audio I/F 48. Although the present embodiment is configured as hardware in which the memory dedicated to image processing is provided, a UMA (Unified Memory Architecture) may be adopted in which a portion of the main memory 34 is used as a memory for image processing, for example. The game apparatus 14 transfers game data generated by executing the game program to the memory card 18 via the memory controller 40 and an external memory I/F 46. Further, the game apparatus 14 loads game data stored in the memory card 18 into the main memory 34 via the memory controller 40 and a memory I/F 46 before the game is started.

Figure 3:
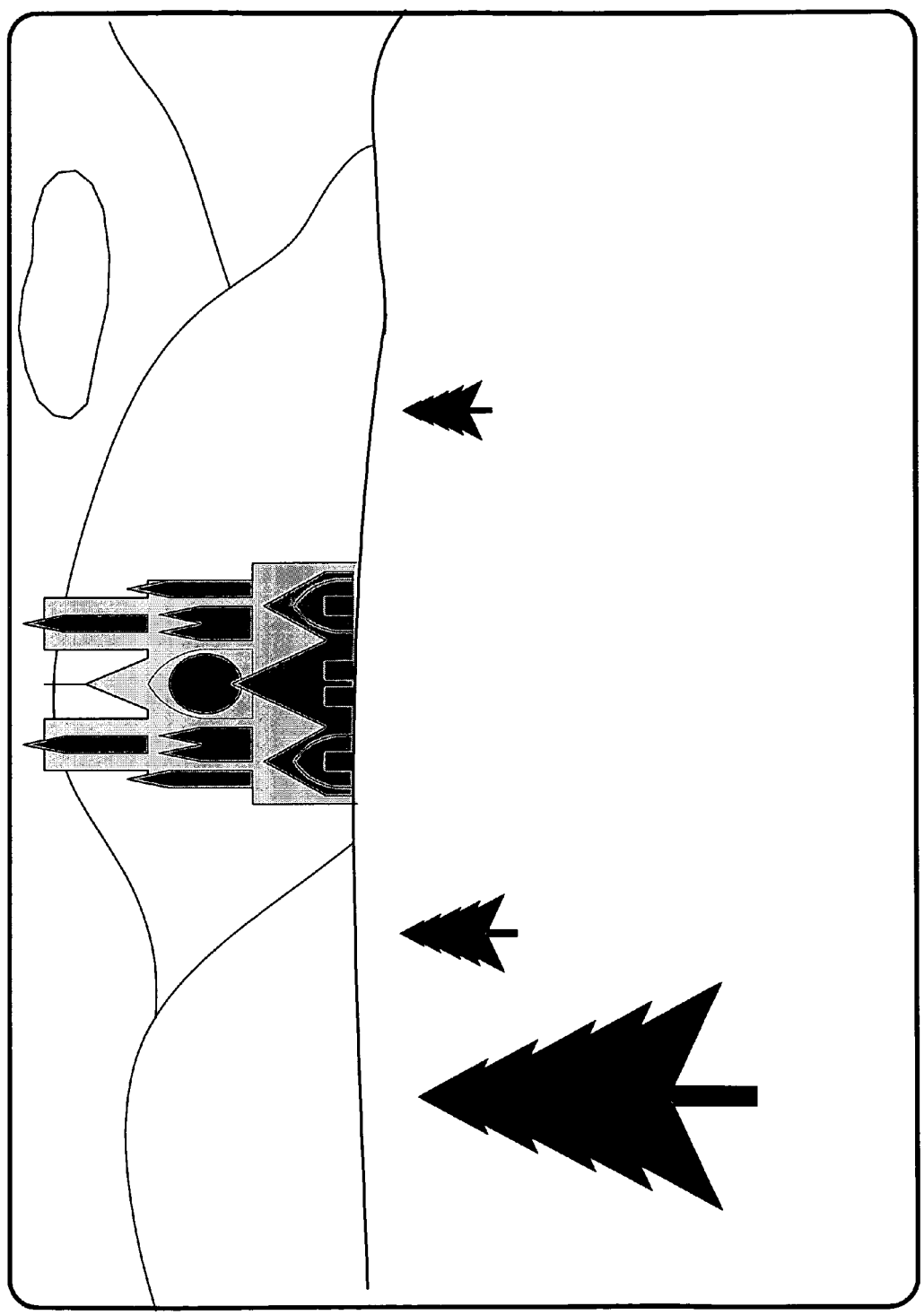
FIG. 3 is a diagram illustrating an example of a game image represented in a game according to the embodiment.

Next, an outline of a focus adjustment performed in a game according to the present embodiment will be described with reference to FIGS. 3 to 19. The game of the present embodiment is an action adventure game in which a player character freely moves for adventure in a virtual 3D game space. FIG. 3 is a diagram illustrating an example of a game image representing the virtual space in the action adventure game according to the present embodiment. As shown in FIG. 3, an image of the virtual space containing a background object is taken by a virtual camera and displayed on the television set 12 as a game image (background image). The game of the present embodiment adopts a first person point of view and a third person point of view. When the game image is based on the first person point of view, a player plays the game from a point of view of the player character in the game. When the game image is based on the third person point of view, the player sees the entire body of the player character from behind the player character. The player can switch between the first person point of view and the third person point of view using a point of view switch button and the like as necessary. In the following description, the image is displayed using the first person point of view.

Figure 4:
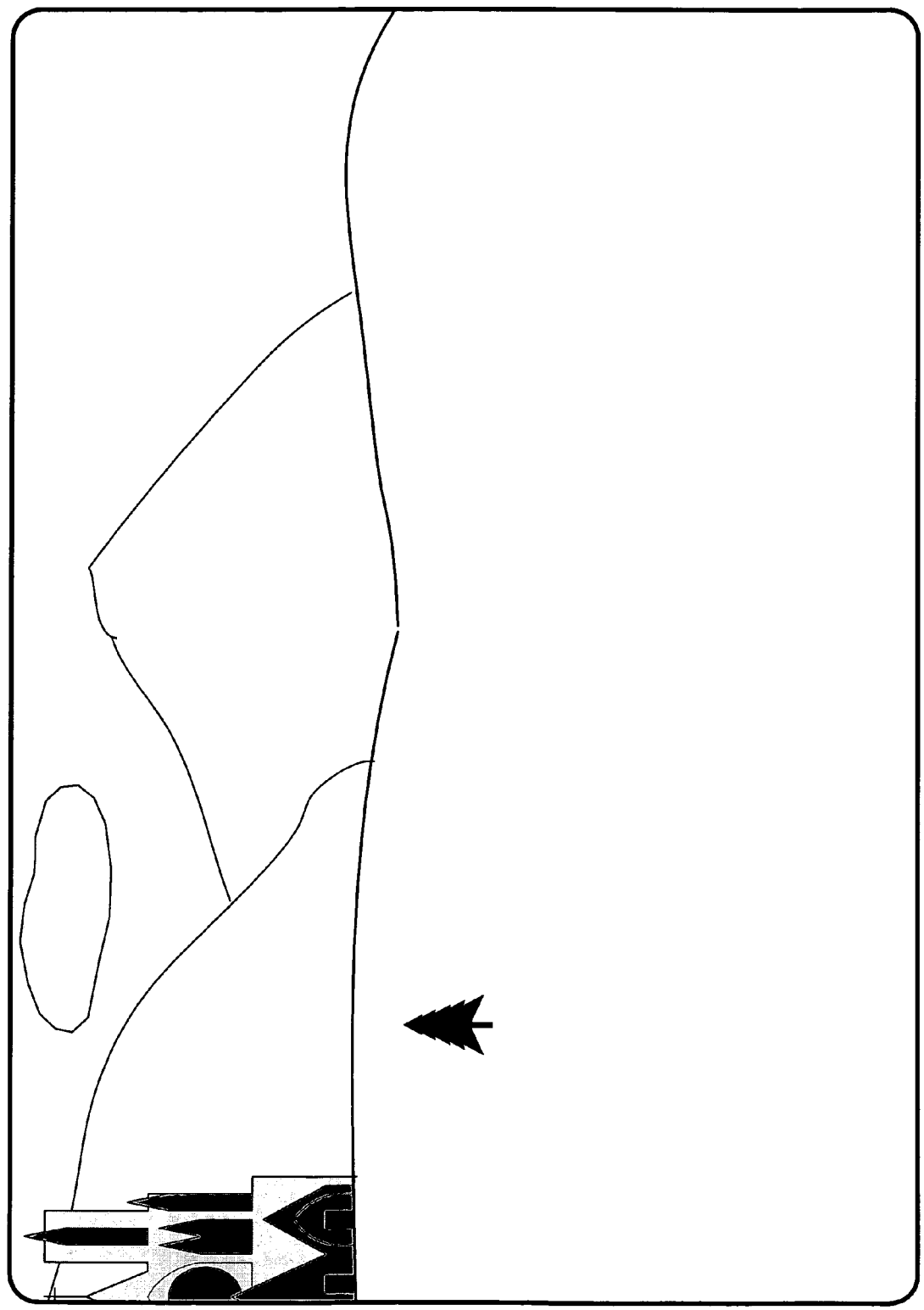
FIG. 4 is a diagram illustrating an example of the game image in which a point of view is being moved in the game according to the embodiment.
Figure 5:
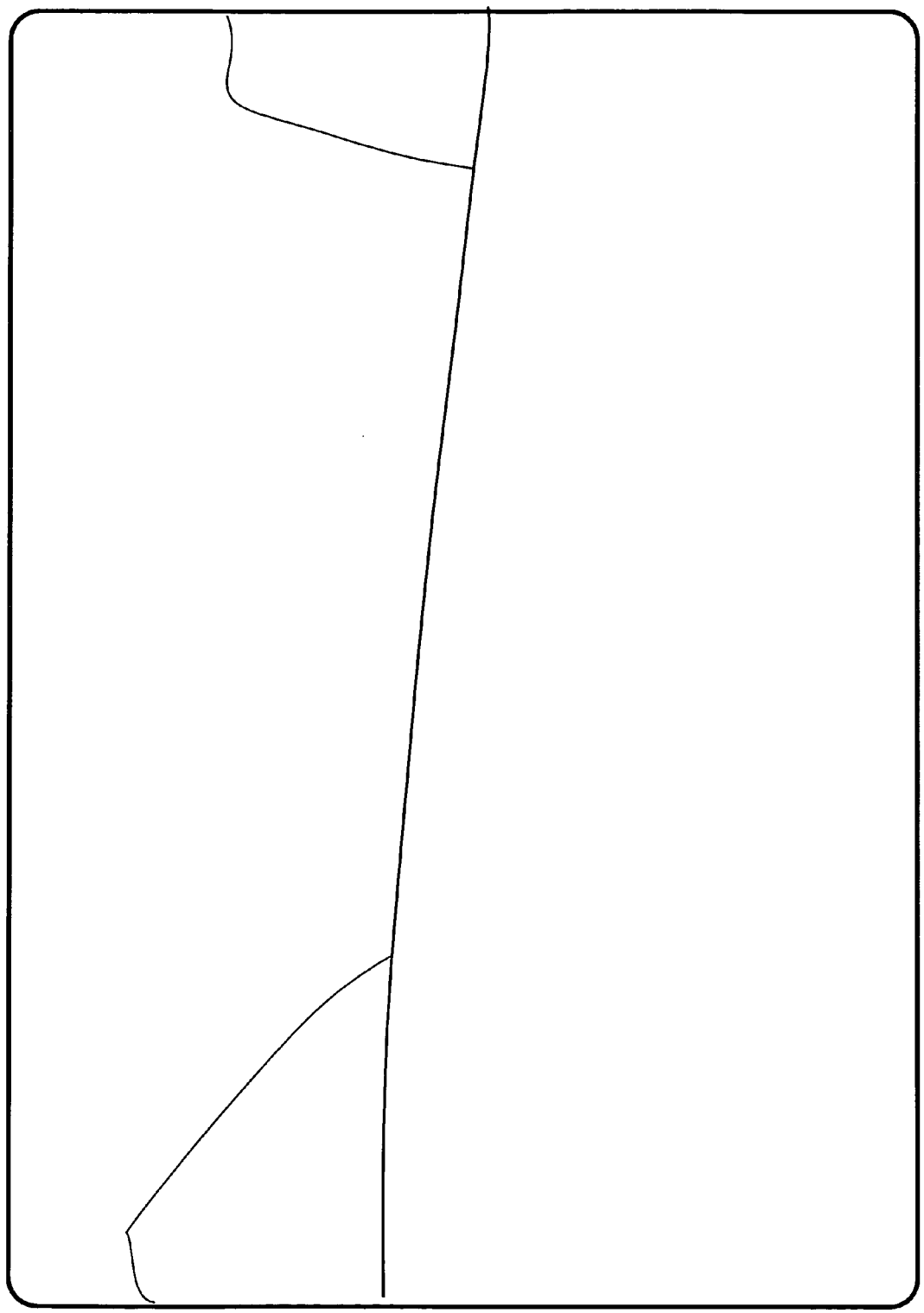
FIG. 5 is a diagram illustrating an example of the game image in which the point of view is being moved in the game according to the embodiment.
Figure 6:
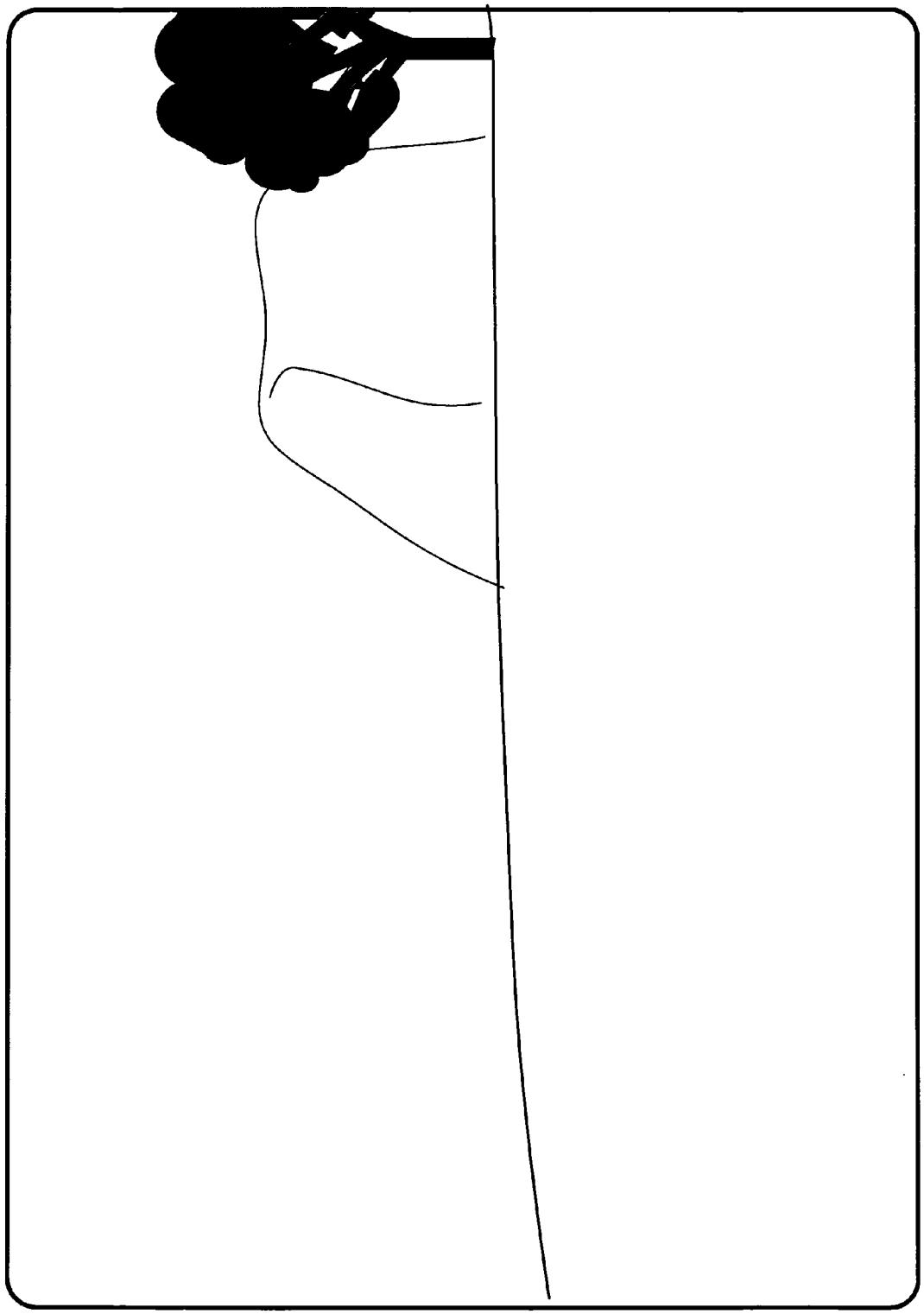
FIG. 6 is a diagram illustrating an example of the game image in which the point of view is being moved in the game according to the embodiment.
Figure 7:
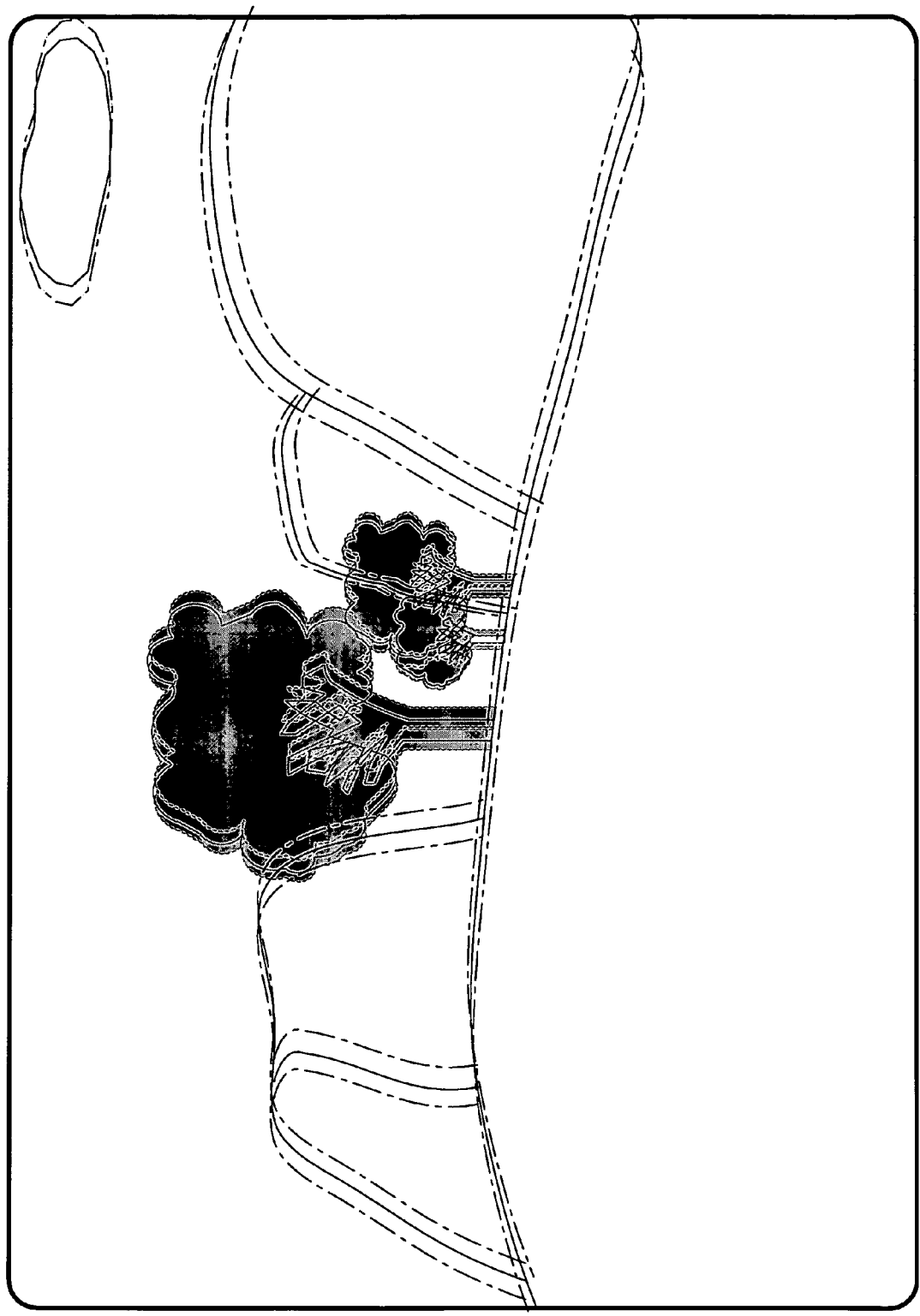
FIG. 7 is a diagram illustrating an example of the game image in which a focus is being adjusted in the game according to the embodiment.
Figure 8:
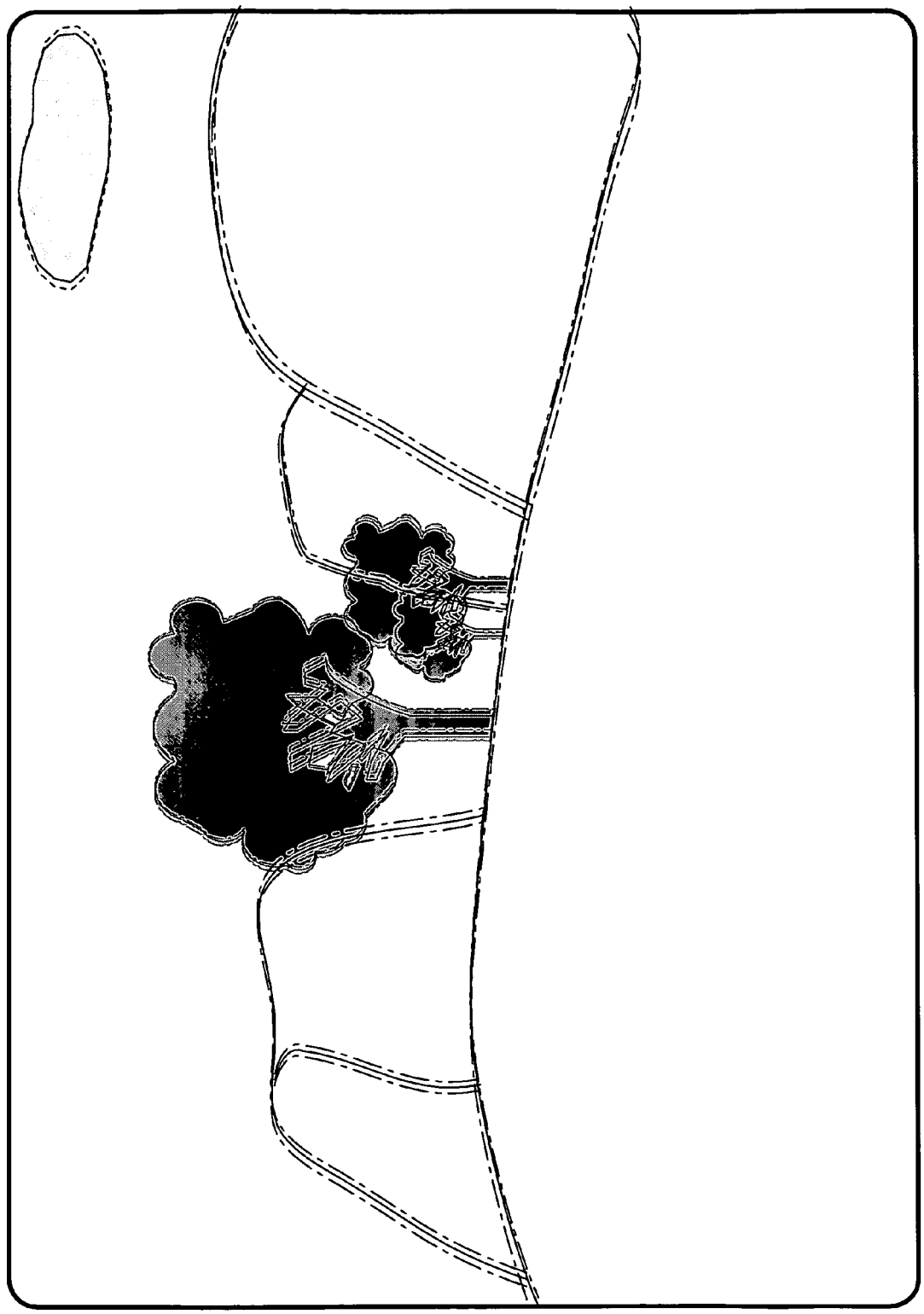
FIG. 8 is a diagram illustrating an example of the game image in which the focus is being adjusted in the game according to the embodiment.
Figure 9:
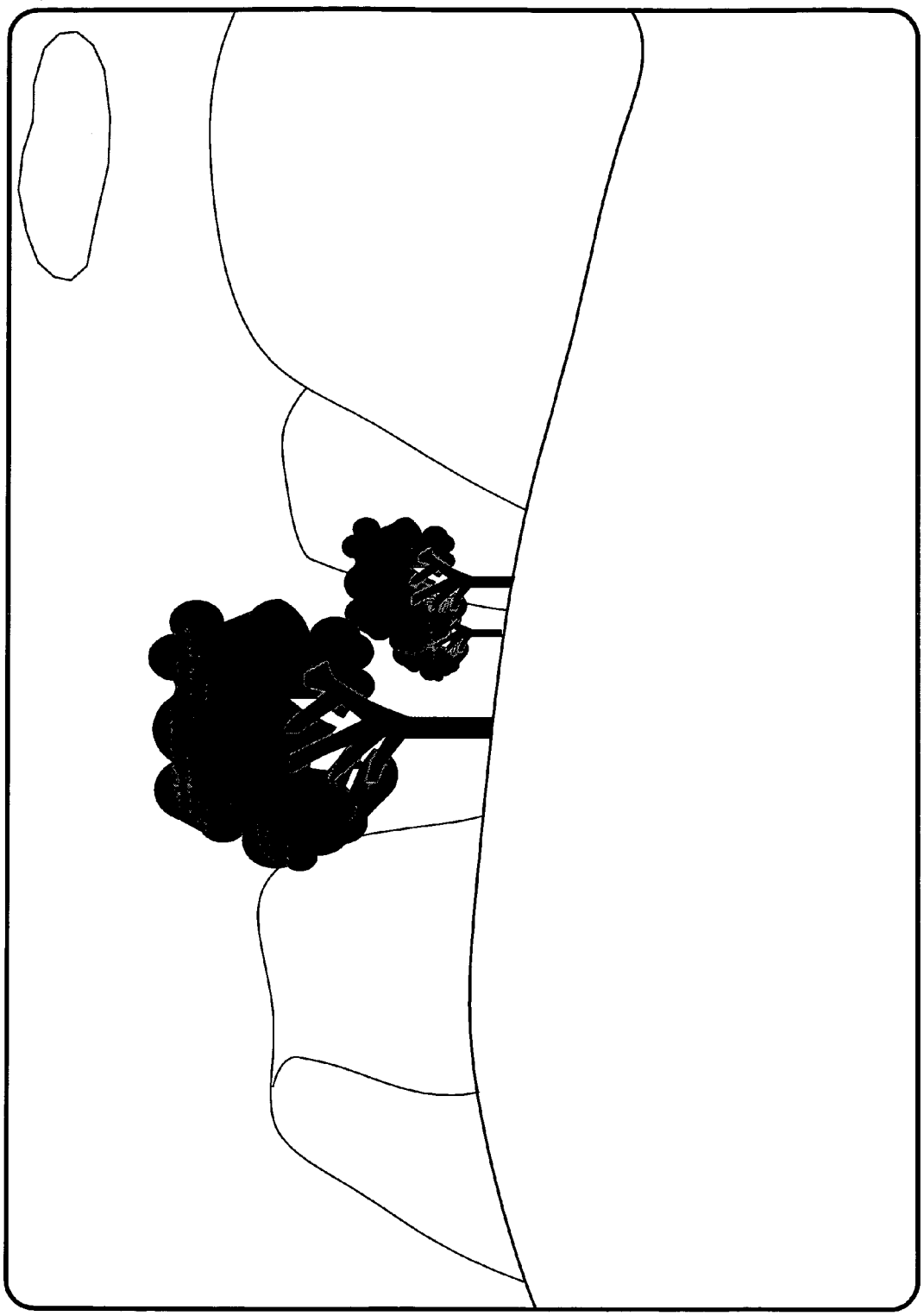
FIG. 9 is a diagram illustrating an example of the game image in which the focus is being adjusted in the game according to the embodiment.

The focus adjustment performed, for example, when a player character quickly turns backward clockwise in a state shown in FIG. 3 will be described. Initially, for example, by operating a direction key or the like in the state shown in FIG. 3, the player character turns backward. In this case, the background changes as shown in FIGS. 4 to 6. At this time, the player character turns backward within, for example, one second. That is, the player character quickly turns backward. When the player character slowly turns backward, defocusing would seldom occur. Immediately after the player character turns backward, the state is as shown in FIG. 7. The player character cannot focus its eyes immediately after the player character has turned backward, so that the background is not distinctly visible. The background gradually becomes distinctly visible as time passes as shown in FIGS. 7 to 9. Thus, according to the present invention, human eye's characteristics that when the player changes his or her point of view, his or her eyes are gradually focused, are represented in the game, thereby providing the game having enhanced reality.

Figure 10:
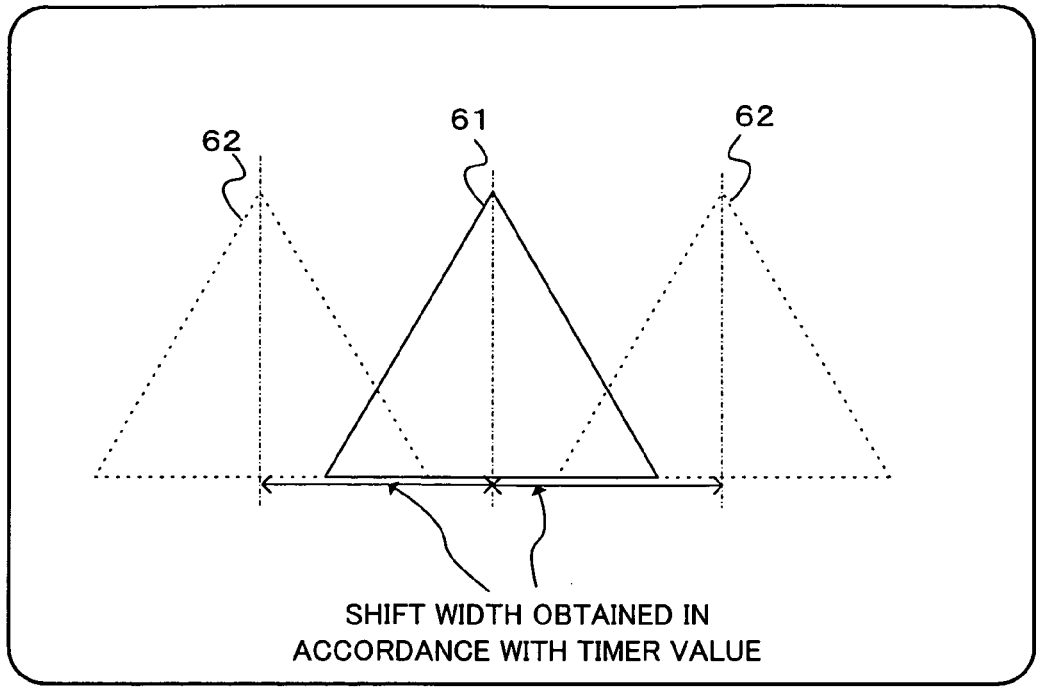
FIG. 10 is a diagram illustrating a principle of a focus adjustment process in the game according to the embodiment.
Figure 11:
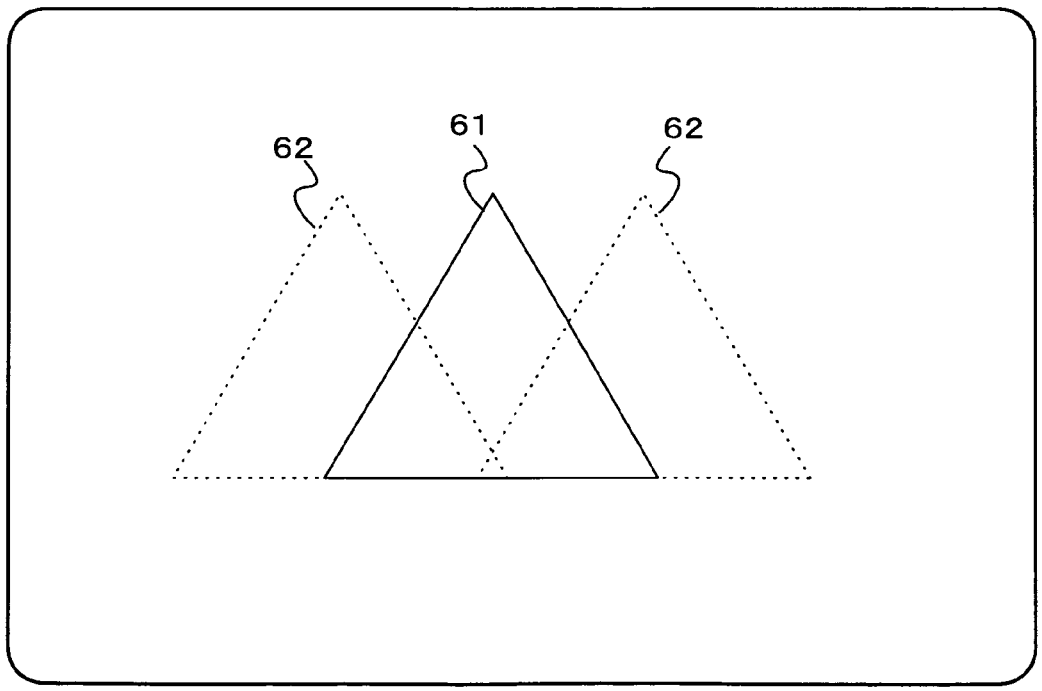
FIG. 11 is a diagram illustrating a blurred image generation process in the game according to the embodiment.
Figure 12:
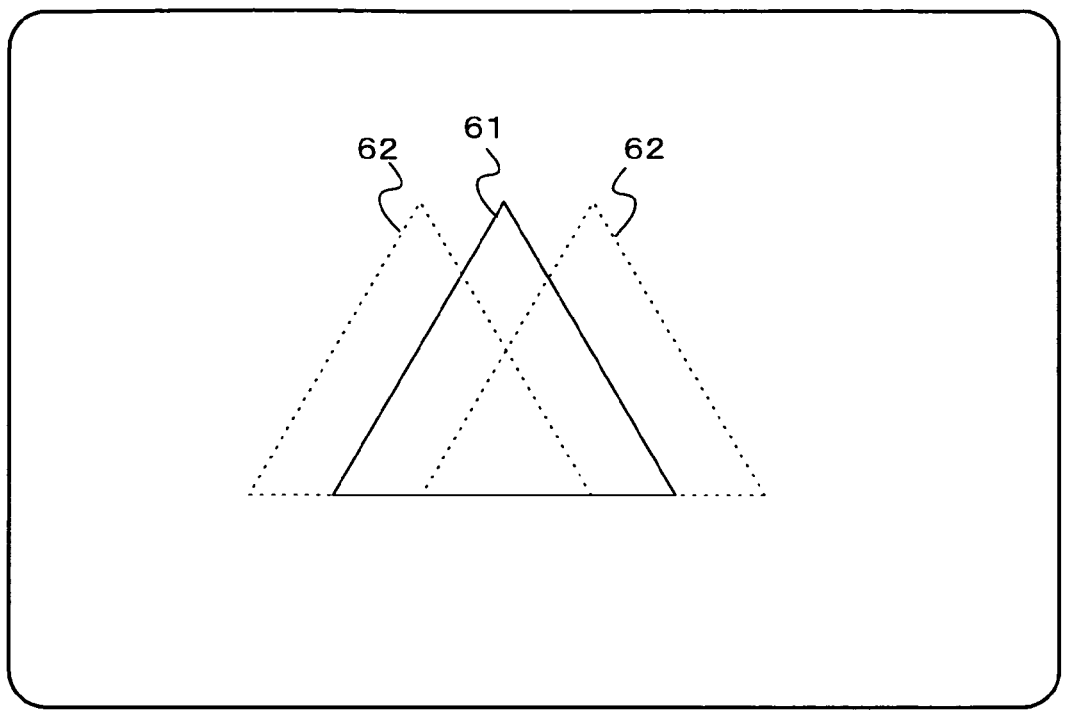
FIG. 12 is a diagram illustrating the blurred image generation process in the game according to the embodiment.
Figure 13:
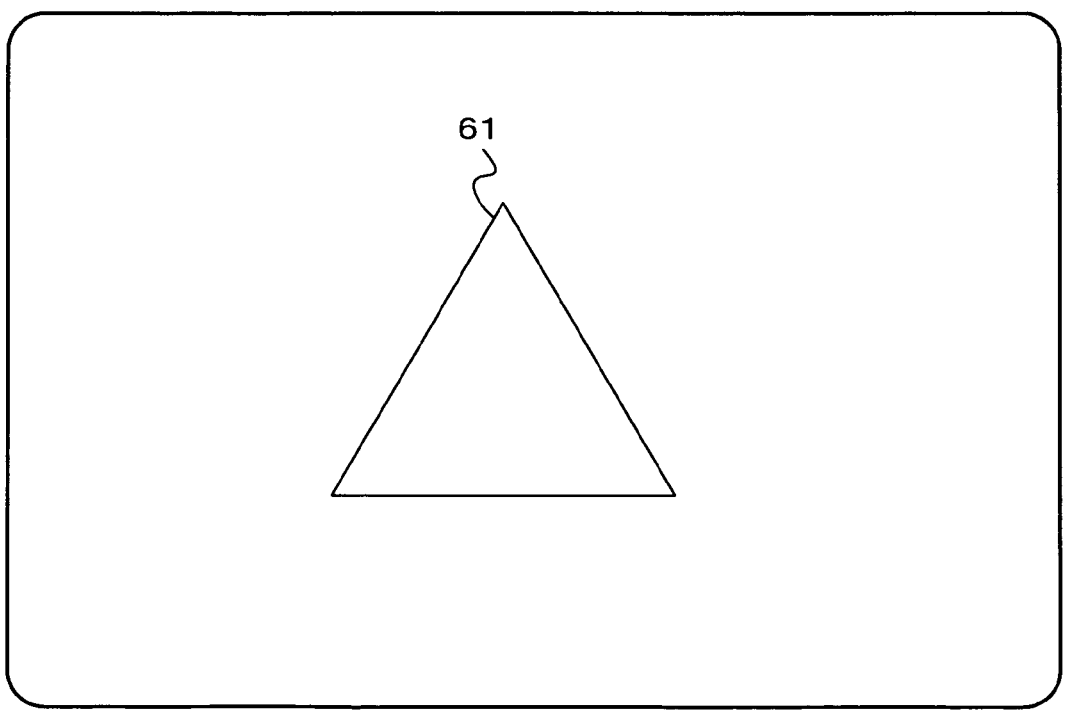
FIG. 13 is a diagram illustrating the blurred image generation process in the game according to the embodiment.

Next, a principle of the focus adjustment process performed in the game according to the present embodiment will be described with reference to FIGS. 10 to 19. In the focus adjustment process, a reference image, shifted images, and timers (a first timer and a second timer) are used. As shown in FIG. 10, an image 61 (hereinafter, referred to as a reference image) is generated as a subject to be rendered. Further, two shifted images 62, which are the same image as the reference image 61, are generated. As shown in FIG. 10, the shifted images 62 are symmetrically disposed with respect to a position at which the reference image 61 is rendered. That is, the respective shifted images 62 are disposed on the right and left sides of the position at which the reference image 61 is rendered, and are equally spaced from the position at which the reference image 61 is rendered so as to dispose the reference image 61 at the midpoint between the respective shifted images 62. Next, the first timer is decremented for each frame. As shown in FIGS. 11 and 12, an image is rendered such that a distance between the reference image and each of the shifted images is gradually narrowed in accordance with values of the first timer. Finally, as shown in FIG. 13, the image is rendered such that each of the shifted images is disposed at the same position as that of the reference image. Thus, the reference image 61 and the shifted images 62 each of which is offset from the reference image by a predetermined distance depending on the values of the first timer are rendered at intervals of a predetermined time period. Therefore, the image can be rendered such that a blurred image gradually becomes distinctly visible as time passes.

Figure 14A:
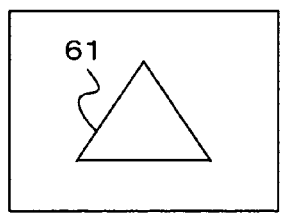
FIG. 14A is a diagram illustrating the blurred image generation process in the game according to the embodiment.
Figure 14B:
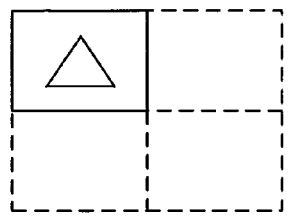
FIG. 14B is a diagram illustrating the blurred image generation process in the game according to the embodiment.
Figure 14C:
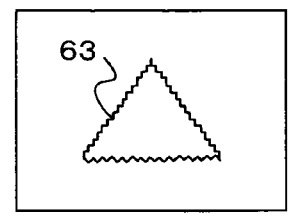
FIG. 14C is a diagram illustrating the blurred image generation process in the game according to the embodiment.

Further, in the present embodiment, as each of the shifted images 62, an image (hereinafter, referred to as a "blurred image") obtained by blurring the reference image is used. The generation of the blurred image will be described with reference to FIG. 14. Initially, the reference image 61 is generated as shown in FIG. 14A. Next, the reference image 61 is reduced in size as shown in FIG. 14B. Then, the reduced image is enlarged to the same size as that of the original reference image 61, thereby generating the blurred image as shown in FIG. 14C. Thus, when the blurred image is used as each of the shifted images, the human eyes' characteristics that the blurred image gradually becomes distinctly visible can be effectively represented in the game.

Figure 15:
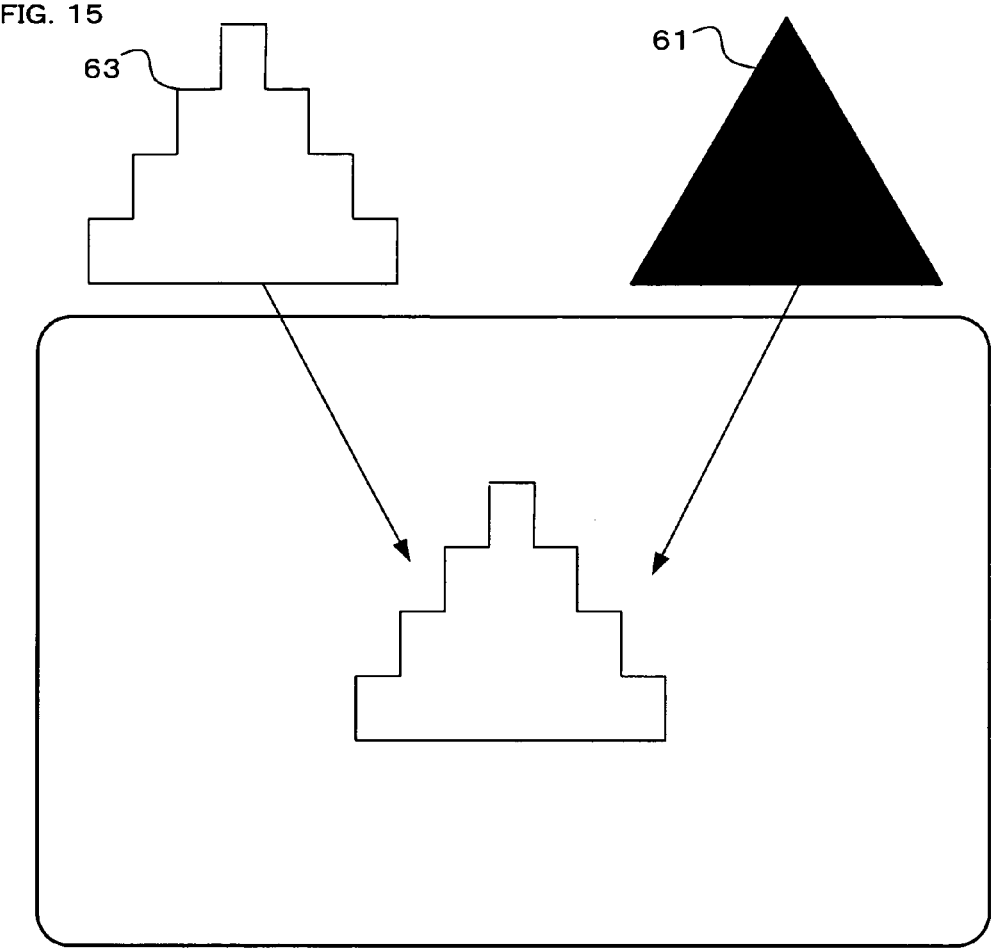
FIG. 15 is a diagram illustrating an image combination process in the game according to the embodiment.
Figure 16:
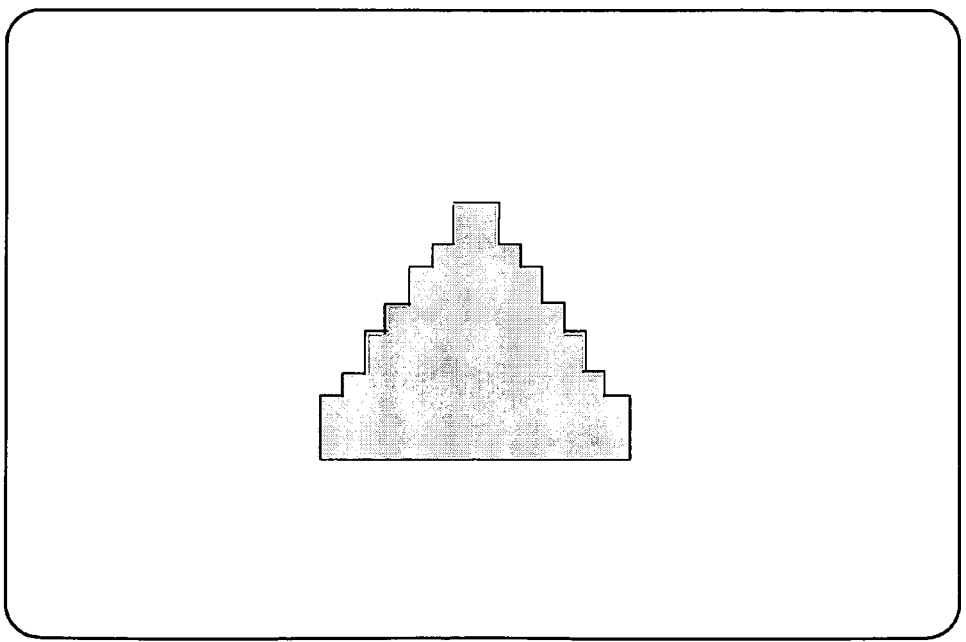
FIG. 16 is a diagram illustrating the image combination process in the game according to the embodiment.
Figure 17:
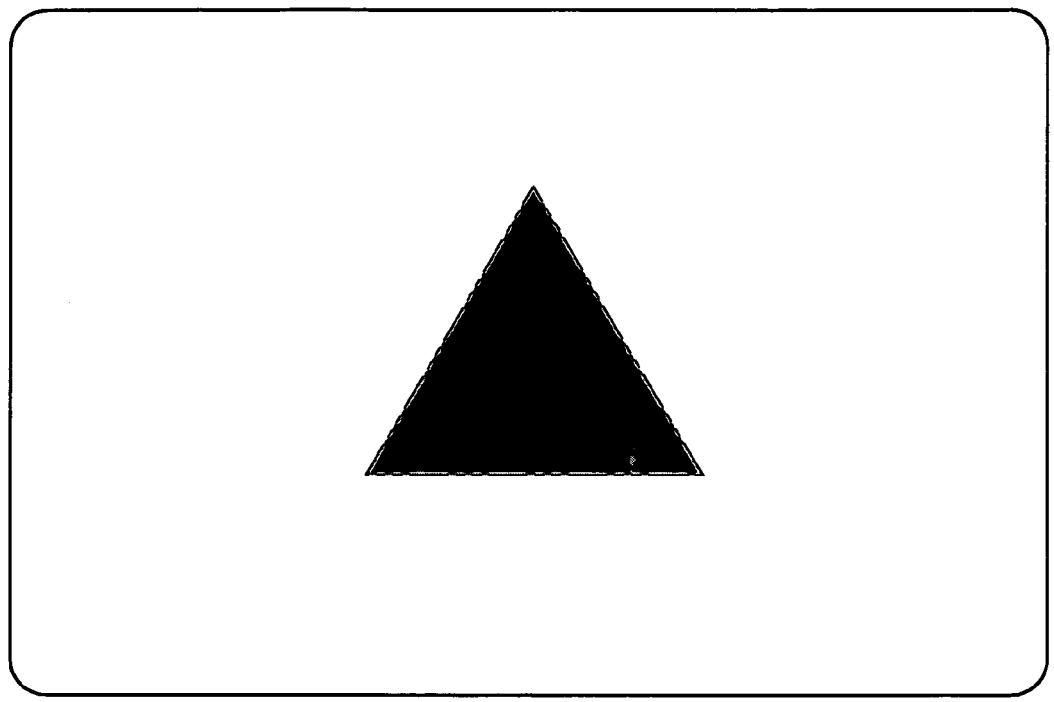
FIG. 17 is a diagram illustrating the image combination process in the game according to the embodiment.
Figure 18:
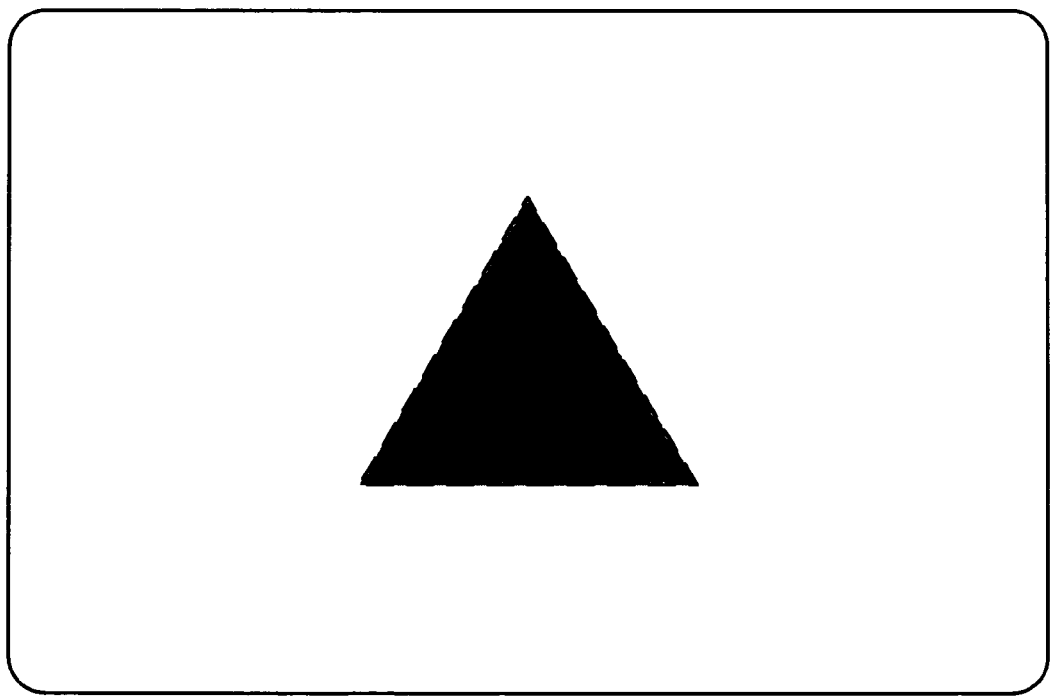
FIG. 18 is a diagram illustrating the image combination process in the game according to the embodiment.
Figure 19:
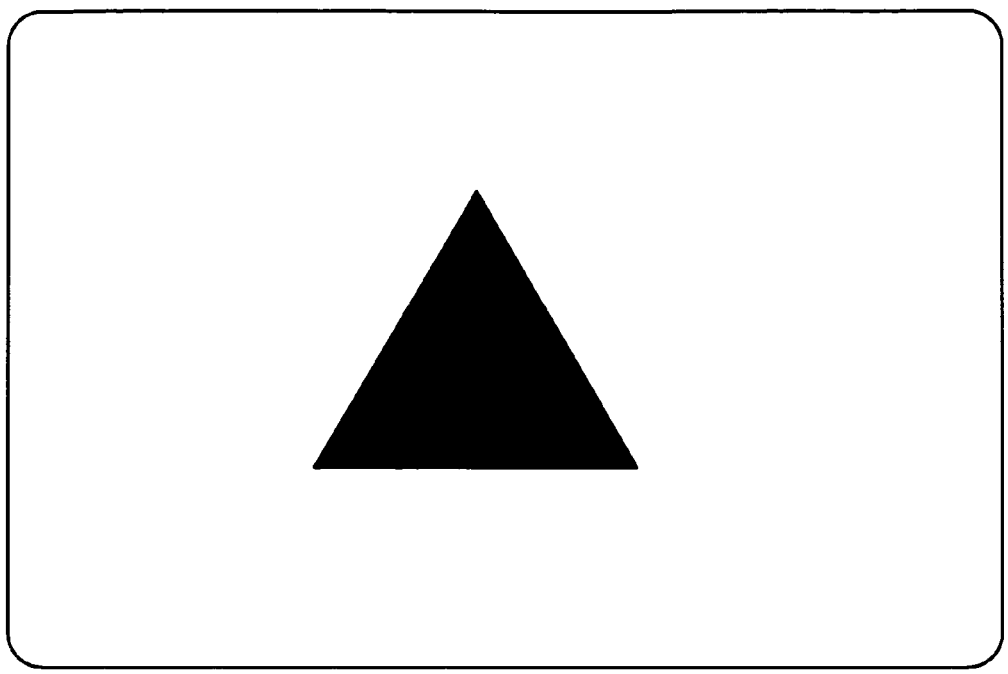
FIG. 19 is a diagram illustrating the image combination process in the game according to the embodiment.

In the present embodiment, in addition to the aforementioned process being performed, a combination ratio of the blurred image to the reference image is gradually changed in accordance with the values of the second timer, thereby representing the aforementioned human eyes' characteristics in the game. Here, the combination ratio of the blurred image to the reference image represents, for example, a brightness of each pixel in the blurred image or a ratio, i.e., an a value representing transmittance. The principle of the process of changing the combination ratio will be described in detail with reference to FIGS. 15 to 19. As shown in FIG. 15, the reference image 61 is initially generated and stored in a frame buffer. Further, the aforementioned blurred images 63 are generated as the shifted images 62. Each of the blurred images 63 is combined with the reference image 61 so as to be superimposed on the reference image 61. At this time, the combination ratio of each of the blurred images 63 to the reference image 61 is set to 100%. When the combination ratio is 100%, the player feels as if only the blurred images 63 are displayed. When the combination ratio is 0%, the player feels as if only the reference image 61 is displayed. Accordingly, since the combination ratio is initially set to 100%, the player feels as if only the blurred images 63 are displayed as shown in FIG. 15. Subsequently, the second timer is decremented in the same manner as the first timer, and the combination ratio is gradually reduced from 100% toward 0% in accordance with the values of the second timer so as to combine the blurred images 63 with the reference image 61 for display as shown in FIGS. 16 to 18. Consequently, the player feels as if only the reference image 61 is displayed as shown in FIG. 19. Thus, the human eyes' characteristics that the blurred image gradually becomes distinctly visible as time passes can be represented in the game.

Figure 20:
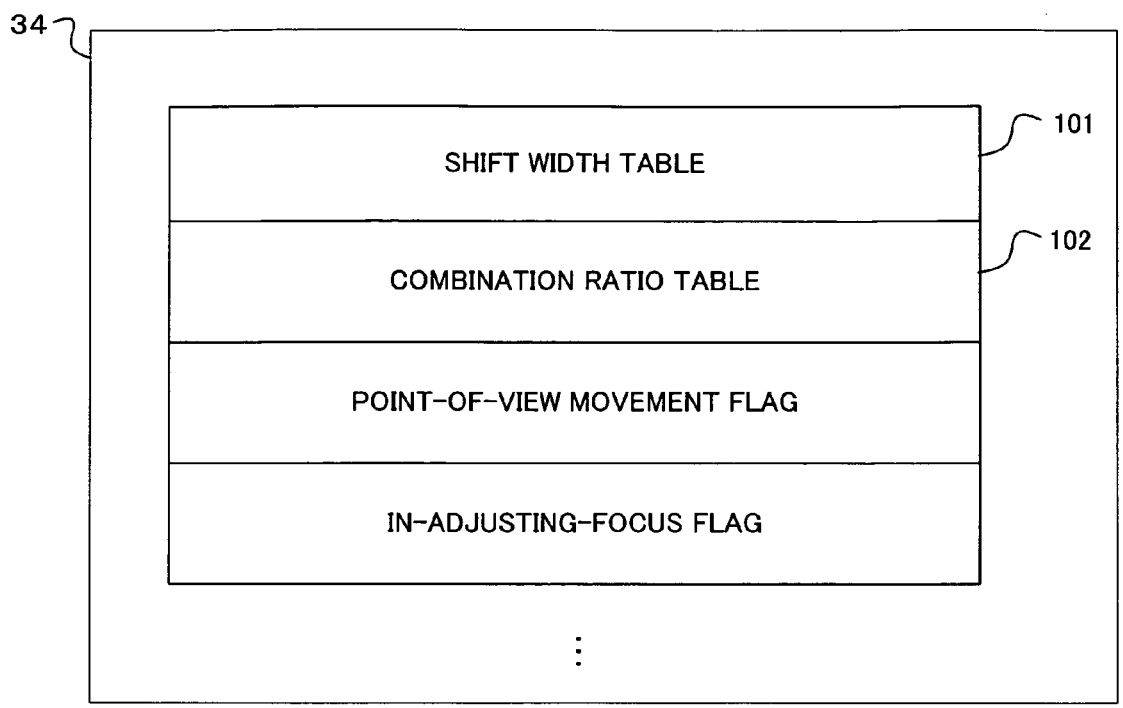
FIG. 20 is a diagram illustrating a memory map of a main memory.

Next, a game process performed by the game apparatus 1 will be described in detail. Firstly, data to be stored in the main memory 34 when performing the game process will be described. FIG. 20 is a diagram illustrating a memory map of the main memory 34 of the game apparatus 1. During the game process, a shift width table 101, a combination ratio table 102, and various flags such as a point-of-view movement flag and an in-adjusting-focus flag are stored in the main memory 34. In addition to the aforementioned data, a game program loaded from the optical disc 16 and data relating to a game image are stored in the main memory 34.

Figure 21:
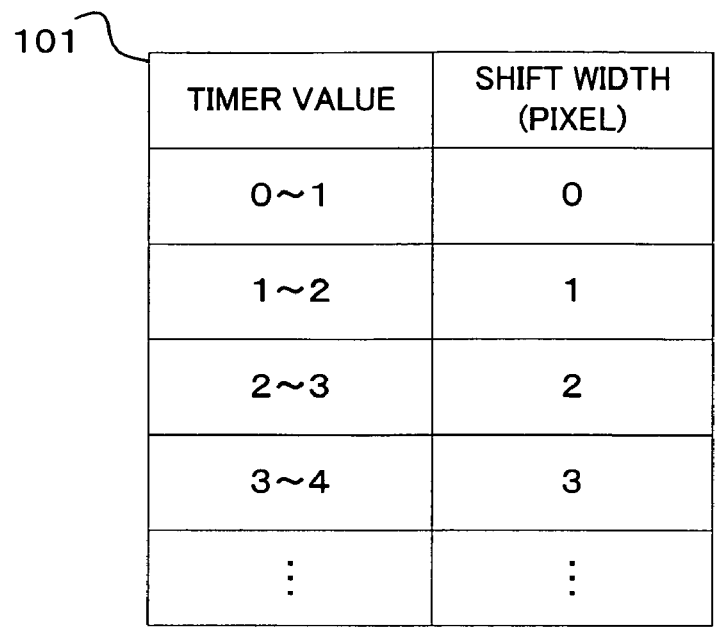
FIG. 21 is a diagram illustrating a shift width table.

FIG. 21 is a diagram illustrating an exemplary data structure of the shift width table 101. In the shift width table 101, values of the first timer are associated with shift widths. That is, the shift width used for determining positions at which the shifted images is disposed is determined in accordance with a value of the first timer.

Figure 22:
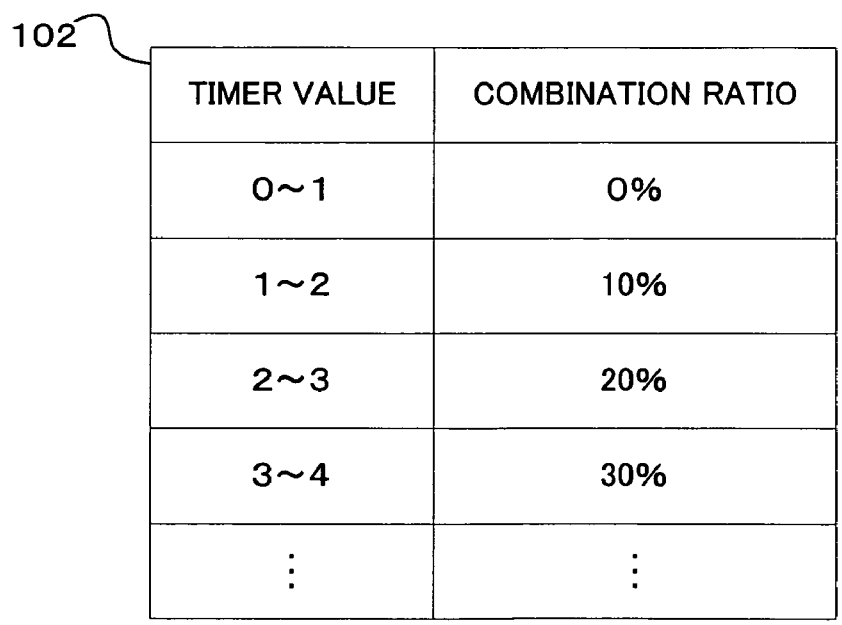
FIG. 22 is a diagram illustrating a combination ratio table.

FIG. 22 is a diagram illustrating an exemplary data structure of the combination ratio table 102. In the combination ratio table 102, values of the second timer are associated with combination ratios. That is, the combination ratio of the blurred image to the reference image is determined in accordance with a value of the second timer.

Figure 23:
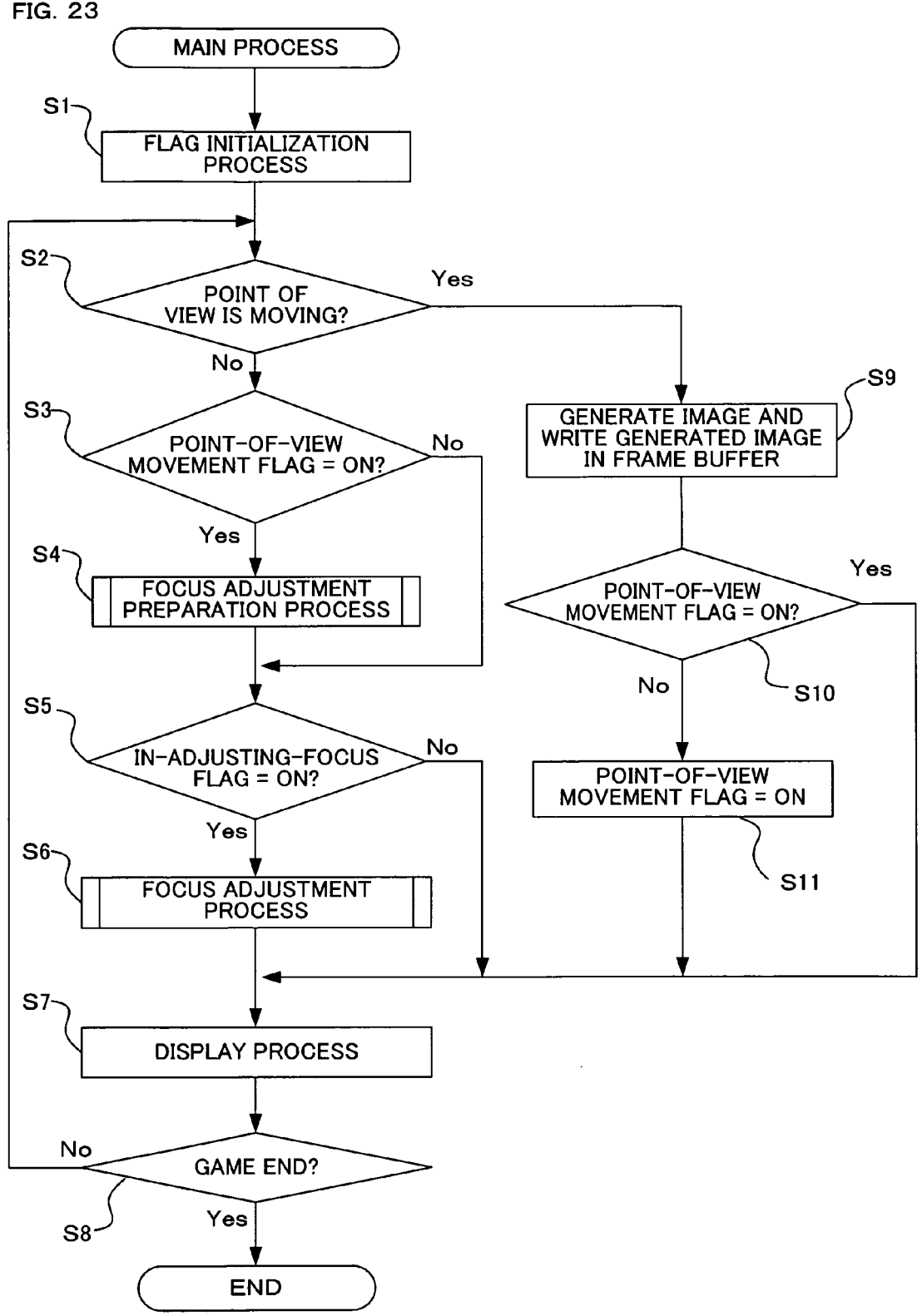
FIG. 23 is a flow chart illustrating a game process.

Next, a flow of the game process performed by the game apparatus 10 will be described with reference to FIGS. 23 to 28. FIG. 23 is a flow chart illustrating a flow of the game process performed by the game apparatus 14. When the game apparatus 14 is powered on, the CPU 22 of the game apparatus 14 executes a boot program stored in a boot ROM not shown so as to initialize the respective units such as the main memory 34. The game program stored in the optical disc 16 is loaded to the main memory 34, thereby starting the execution of the game program. As a result, a game image is displayed on the television set 12 via the GPU 24 such that the player can start a game play. In the present embodiment, among the game processes, only the focus adjustment process will be described. Other game process, which are not directly relevant to the present invention, will not be described in detail.

As shown in FIG. 23, the respective flags and the like are initialized in step S1. Subsequently, it is determined in step S2 whether or not a point of view of the virtual camera is being moved by the player's operation or the like. When it is determined that the point of view is being moved (Yes in step S2), an image seen from the virtual camera being moved is generated and written in the frame buffer in step S9. Next, it is determined in step S10 whether or not the point-of-view movement flag indicating whether or not the point of view is being moved is set to "ON". When it is determined that the point-of-view movement flag is set to "OFF" (No in step S10), the point-of-view movement flag is set to "ON" in step S11. The process advances to a display process in step S7. On the other hand, when it is determined that the point-of-view movement flag is set to "ON" (Yes in step S10), step S11 is skipped and the process advances to step S7.

On the other hand, when it is determined that the point of view is not being moved (No in step S2), it is determined in step S3 whether or not the point-of-view movement flag is set to "ON". When it is determined that the point-of-view movement flag is set to "ON" (Yes in step S3), it is immediately after the movement of the point-of-view has been completed. At this time, a focus adjustment preparation process is performed in step S4. The focus adjustment preparation process will be described later in detail.

On the other hand, when it is determined that the point-of-view movement flag is set to "OFF" (No in step S3), it is not immediately after the movement of the point-of-view has been completed. The focus adjustment preparation process in step S4 is skipped, and the process advances to step S5.

It is determined in step S5 whether or not the in-adjusting-focus flag indicating whether or not the focus adjustment process is being performed is set to "ON". When it is determined that the in-adjusting-focus flag is set to "ON" (Yes in step S5), the focus adjustment process (step S6) is performed so as to represent the aforementioned human eyes' characteristics in the game. The focus adjustment process will be described later in detail. On the other hand, when it is determined that the in-adjusting-focus flag is set to "OFF" (No in step S5), the focus adjustment process is skipped and the process advances to step S7.

Next, a display process is performed in step S7. That is, the image written in the frame buffer is displayed on the television set 12. Following step S7, it is determined in step S8 whether or not the game is to be ended. When it is determined that the game is to be ended (Yes in step S8), the game process is ended. When it is determined that the game is not to be ended (No in step S8), the process is returned to step S2 so as to repeat the game process. This is the end of the game process.

Figure 24:
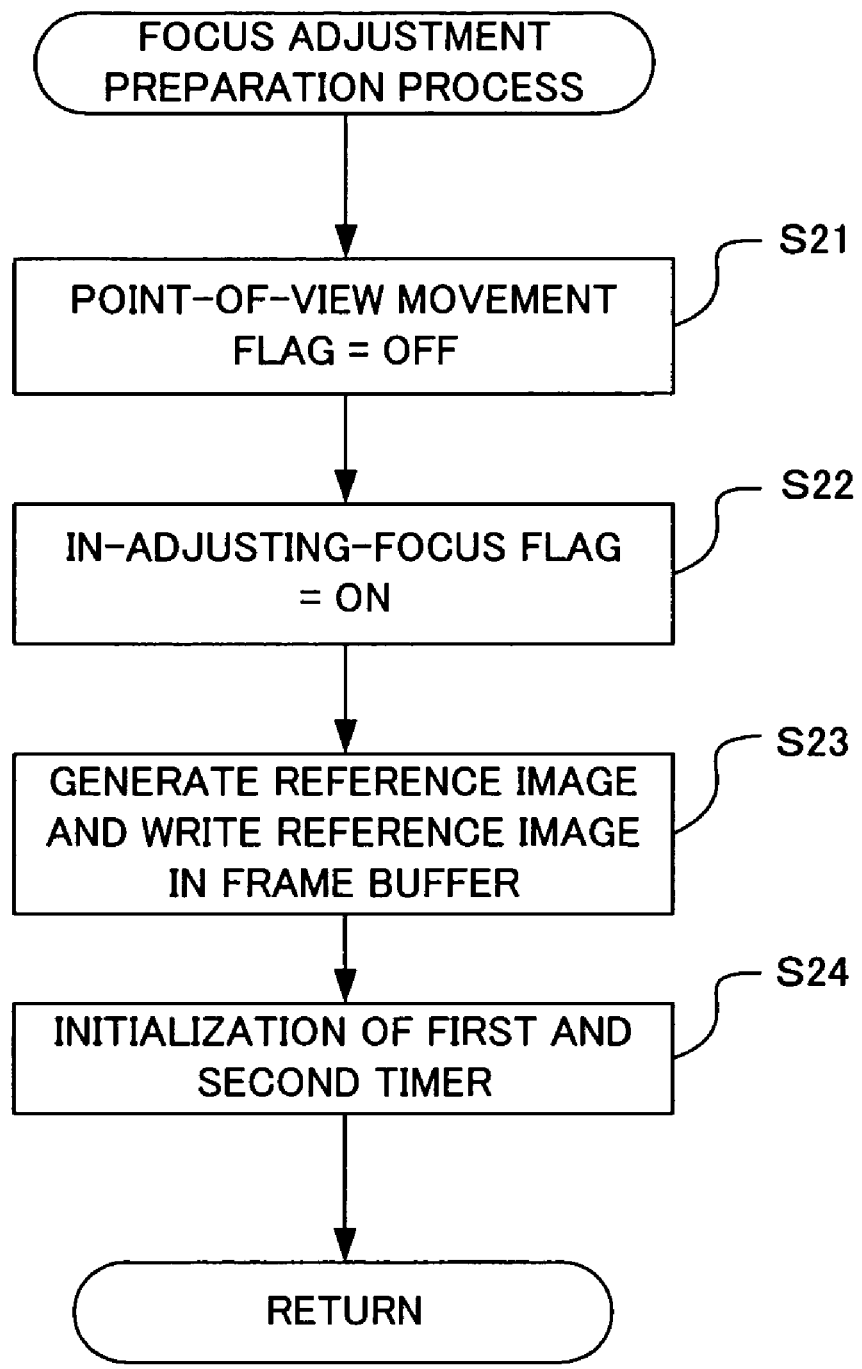
FIG. 24 is a flow chart illustrating a focus adjustment preparation process.

Next, the focus adjustment preparation process in step S4 will be described in detail. FIG. 24 is a flow chart illustrating in detail the focus adjustment preparation process in step S4. As shown in FIG. 24, the point-of-view movement flag is set to "OFF" in step S21. Next, the in-adjusting-focus flag is set to "ON" in step S22. Subsequently, an image seen from the virtual camera is generated as the reference image. The reference image is written in the frame buffer in step S23. In step S24, the first timer and the second timer are initialized which are used for determining the shift width and the combination ratio described later. For example, each of the first timer and the second timer is initialized to 60. The initial values of the timers may be preset or may be determined as necessary in accordance with the distance from the virtual camera to a sight point thereof referring to the timer setting table 103 shown in FIG. 25 and the like. In the timer setting table 103 shown in FIG. 25, the distances (Z value) from the virtual camera to the sight point thereof are associated with values of the timers. This is the end of the focus adjustment preparation process in step S4.

Figure 26:
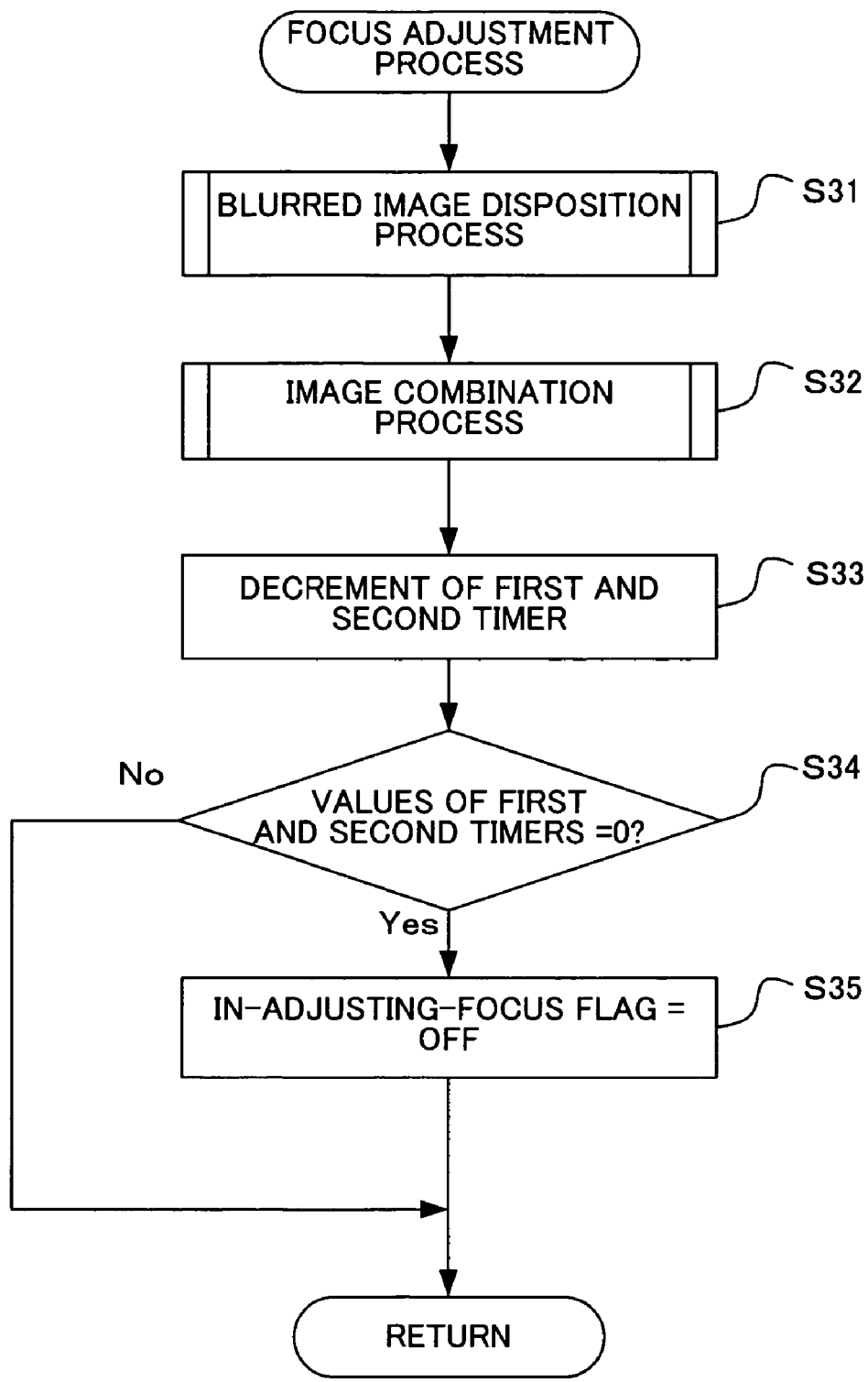
FIG. 26 is a flow chart illustrating the focus adjustment process.

Next, the aforementioned focus adjustment process in step S6 will be described in detail. FIG. 26 is a flow chart illustrating in detail the focus adjustment process in step S6. As shown in FIG. 26, in step S31, a blurred image disposition process is performed for generating and disposing the blurred images 63 as described with reference to FIG. 14.

Figure 27:
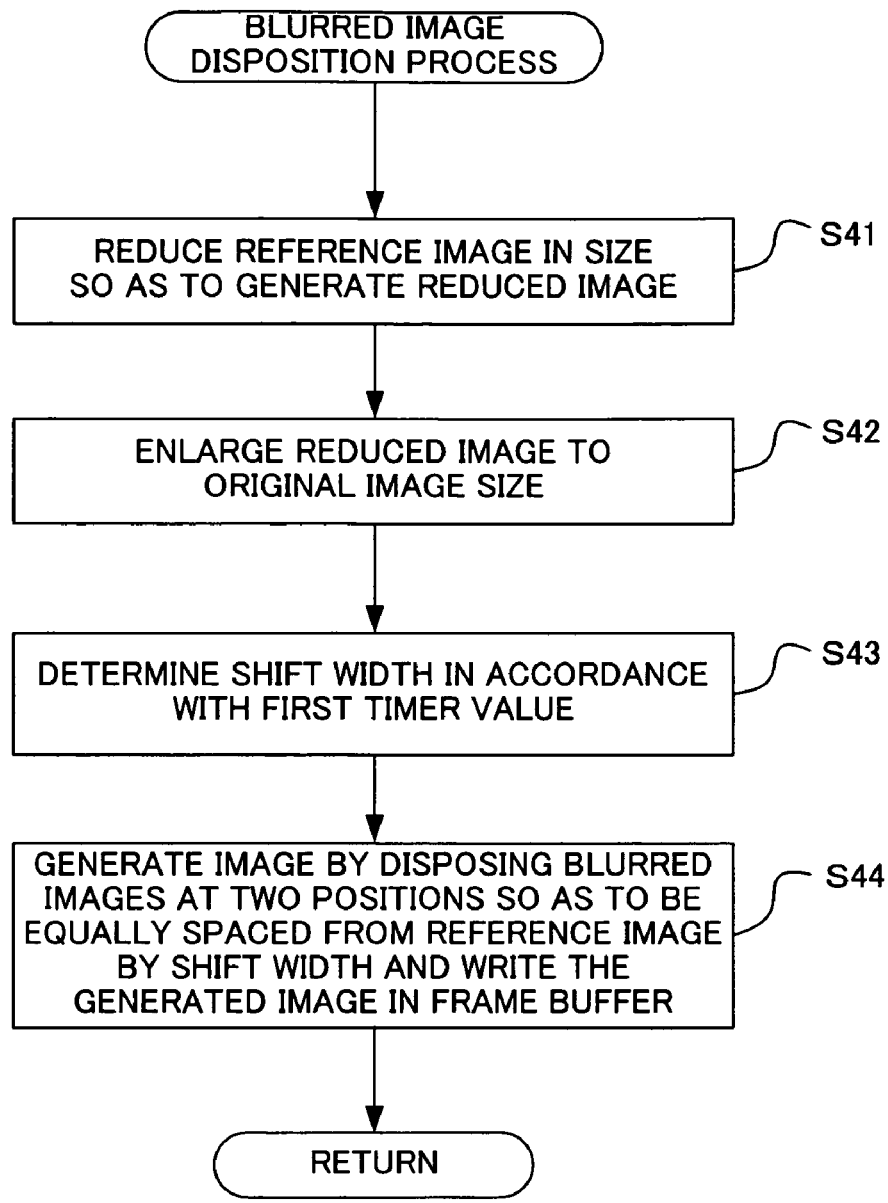
FIG. 27 is a flow chart illustrating a blurred image disposition process.

FIG. 27 is a flow chart illustrating in detail the blurred image disposition process in step S31. As shown in FIG. 27, the reference image is reduced in size at a predetermined magnification in step S41. In step S42, the reduced image is enlarged up to the same size as that of the original reference image, thereby generating the blurred image. In step S43, with reference to the shift width table 101, the shift width is determined in accordance with the value of the first timer. In step S44, an image is generated by displacing the center points of the blurred images by the shift width in the right and left directions, respectively, from the position (corresponding to the center point of the image) at which the reference image is rendered, and the generated image is written in the frame buffer. This is the end of the blurred image disposition process.

Figure 28:
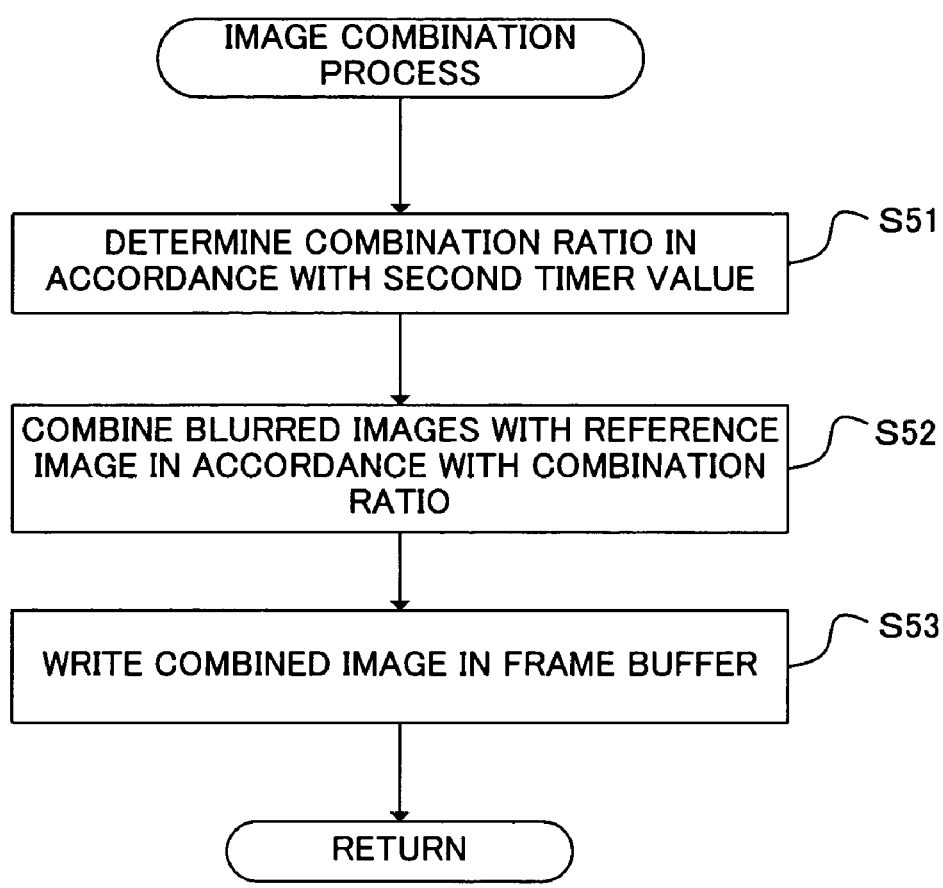
FIG. 28 is a flow chart illustrating the image combination process.

Returning to FIG. 26, following the blurred image disposition process in step S31, the combination ratio of the blurred image to the reference image is determined so as to perform an image combination process for combining the reference image with the blurred images in step S32. FIG. 28 is a flow chart illustrating in detail the image combination process in step S32. As shown in FIG. 28, with reference to the combination ratio table 102, the combination ratio is determined in accordance with the values of the second timer in step S51. In step S52, the reference image is combined with the blurred images based on the combination ratio. That is, a color (brightness) of each pixel of the blurred image is adjusted based on the combination ratio having been determined. Specifically, the brightness of the blurred image is initially set to 100%, and the combination ratio is gradually reduced in accordance with the values of the second timer. Therefore, an image can be represented such that the blurred image gradually becomes a distinctly visible image corresponding to the reference image as time passes. Following step S52, the image obtained by combining the reference image with the blurred images is written in the frame buffer in step S53. This is the end of the image combination process.

Returning to FIG. 26, after the image combination process in step S32 is completed, each of the first timer and the second timer is decremented by a predetermined value (for example, one) in step S33. Next, it is determined in step S34 whether or not the first timer and the second timer have their values set to zero. When it is determined that the first timer and the second timer have their values set to zero (Yes in step S34), the in-adjusting-focus flag is set to "OFF" in step S35, and the focus adjustment process is completed. On the other hand, when it is determined that the first timer and the second timer have their values set to a value other than zero (No in step S34), step S35 is skipped and the focus adjustment process is ended.

Thereafter, the aforementioned display process is performed in step S7. Thus, an image is displayed such that, as the first timer is decremented, the respective blurred images disposed on the right and the left sides of the reference image gradually approach the position of the reference image. At the same time, the combination ratio of the blurred image to the reference image is gradually reduced in accordance with the values of the second timer. Therefore, an image is displayed such that the blurred image gradually becomes distinctly visible.

As described above, in the present embodiment, two blurred images are generated based on the reference image and disposed on the right and the left sides of the reference image, respectively. An image is displayed such that, as the first timer is decremented, the respective blurred images disposed on the right and the left sides of the reference image gradually approach the position of the reference image. At the same time, the image is displayed such that the combination ratio of the blurred image to the reference image is gradually reduced in accordance with the values of the second timer, whereby the blurred image gradually becomes distinctly visible. Thus, the human eyes' characteristics that a blurred image gradually becomes distinctly visible can be represented on the game screen, thereby providing a player with a game having enhanced reality. Further, it is unnecessary to calculate a distance between the virtual camera and each object in the virtual game space, and the like, so as to calculate a degree of blurring and the like for each object, thereby reducing processing load.

Although in the above-described embodiment the shift width and the combination ratio are determined with reference to the tables, the shift width and the combination ratio may be calculated as necessary in accordance with the values of the timers. For example, the shift width and the combination ratio may be calculated based on both the values of the timers and the distance between the virtual camera and the sight point thereof. The combination ratio may be calculated or changed as necessary in accordance with the shift width having been calculated. For example, the shift width may be calculated in accordance with a value of the timer and the combination ratio may be calculated in accordance with the shift width having been calculated. Further, an initial value of the combination ratio is read from the table at the start of the focus adjustment process, and the combination ratio having been read may be changed against the shift width being calculated in accordance with the value of the timer.

Further, initial values of the timers and the decrements may be determined depending on a change in environment in the virtual game space such as a change in brightness (for example, a day or a night). For example, while the virtual game space represents a day, that is, when it is bright, each of the timers is decremented by a relatively large value, so that the image becomes distinctly visible at a relatively high speed. On the other hand, when the virtual game space represents a night, that is, when it is dark, each of the timers is decremented by a relatively small value, so that the image becomes distinctly visible at a lower speed than that used for the day. Moreover, for example, the initial values of the timers and the decrements may be changed in accordance with a parameter indicating a state of the player object, and the like. That is, when a player character, which is usually a human being, is transformed to a wolf, each of the timers may be decremented by a larger value than that used for the human being so as to focus the wolf's eyes more quickly as compared to the human eyes. Thus, the game can be effectively represented with enhanced reality depending on a game content, thereby providing the game having enhanced entertainment.

Furthermore, the process relating to the focus adjustment may be performed in accordance with the environment in the virtual game space. For example, when the player character suddenly moves to a well-lighted area from a dark area in the virtual game space, or immediately after the player character, which is usually a human being, is suddenly transformed to a wolf, the process relating to the focus adjustment may be performed. That is, in step S2 shown in FIG. 23, for example, it is determined whether or not the brightness is changed by a value greater than a predetermined value in the virtual game space, or it is determined whether or not the player character is transformed, instead of whether or not the point of view is being moved. Thus, the game can be effectively represented with enhanced reality depending on a game content, thereby providing the game having enhanced entertainment.

Further, although in the aforementioned embodiment two blurred images are respectively disposed on the right and the left sides of the reference image, three or four blurred images may be used. In this case, for example, four blurred images are disposed on the right, the left, the upper and the lower sides of the reference image, respectively, and the respective blurred images are equally spaced from the reference image. As described above, the shift width can be gradually reduced. Thus, an effect of the blurred image gradually becoming distinctly visible can be enhanced when the image is represented.

In addition, the same images as the reference image may be used as the shifted images without using the blurred images. In this case, the image combination process in step S32 can be eliminated, thereby reducing the processing load. Further, in this case, the human eyes' characteristics that the blurred image gradually becomes distinctly visible as time passes can be represented on the game screen. On the other hand, only the combination process may be performed. In this case, while the blurred images are generated, it is unnecessary to displace the blurred images from the reference image, thereby reducing the processing load for the blurred image disposition process. Further, in this case, the human eyes' characteristics that the blurred image gradually becomes distinctly visible as time passes can be represented on the game screen.

In the aforementioned embodiment, the images are symmetrically disposed on the right and the left sides of the reference image, respectively, that is, the reference image is disposed at the midpoint between the respective images, thereby displaying the obtained image. However, the reference image to be disposed at the midpoint may not be initially displayed. That is, only the images disposed on the right and the left sides of the reference image are initially displayed, and the images on the right and the left sides are moved so as to gradually approach the position at which the reference image is to be displayed. When the shift width reaches zero, only the reference image may be displayed.

Moreover, the first timer and the second timer may be decremented by values different from each other. For example, the first timer may be decremented by one for each frame while the second timer may be decremented by two for each frame. Thus, for example, an image can be represented such that although the image having been laterally blurred stops blurring, i.e., the image having been blurred on the right and the left edges stops blurring, the image is not distinctly visible. Thus, the image can be represented using a difference between the time required for the blurred image disposition process and the time required for the image combination process. Accordingly, the blurred image gradually becomes distinctly visible in various manners, thereby enabling various image representations.

Further, in the focus adjustment process described with reference to FIG. 26, after the blurred images are generated and the generated blurred images are disposed at positions offset from the position of the reference image, the image combination process is performed. However, the order of the blurred image disposition process and the image combination process can be reversed. That is, after the blurred images are generated and the generated blurred images are subjected to the image combination process, the blurred images having been subjected to the image combination process may be disposed at positions offset from the position of the reference image.

Figure 29:
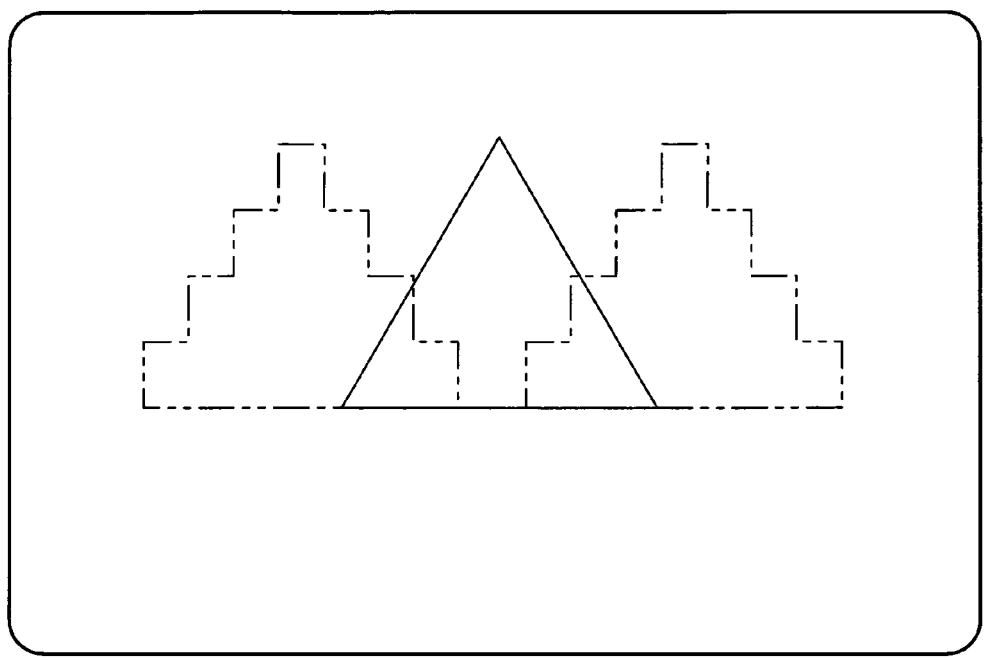
FIG. 29 is a diagram illustrating in general the image combination process performed using a time difference.
Figure 30:
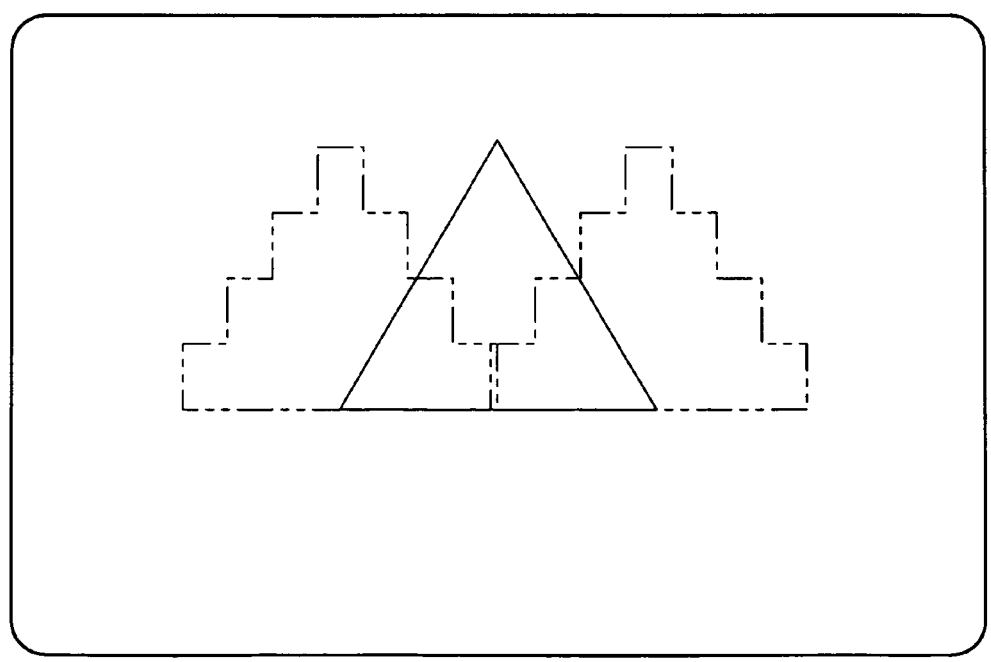
FIG. 30 is a diagram illustrating in general the image combination process performed using the time difference.
Figure 31:
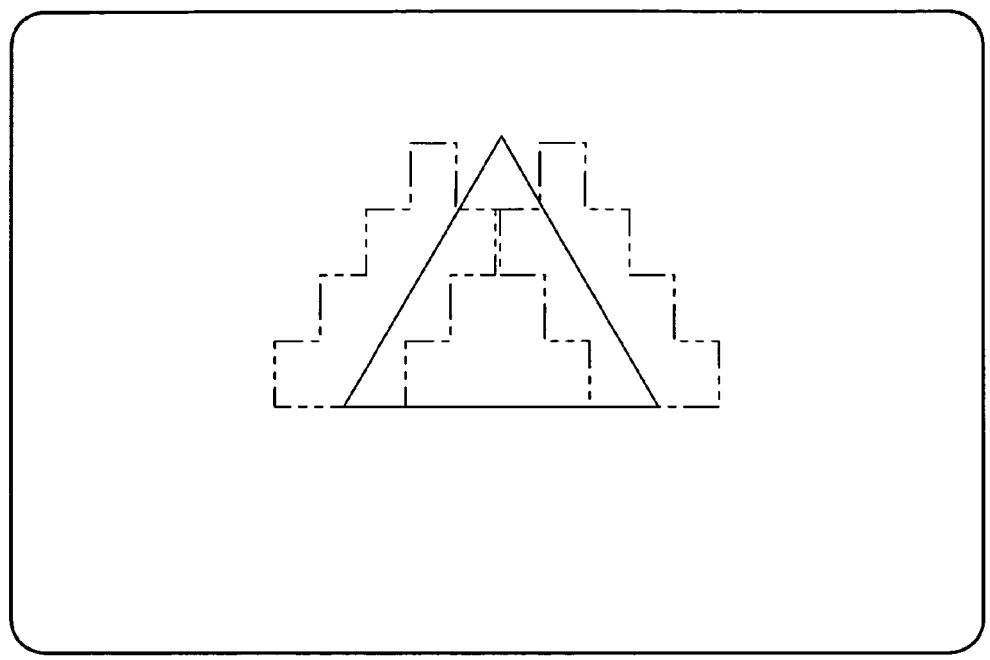
FIG. 31 is a diagram illustrating in general the image combination process performed using the time difference.
Figure 32:
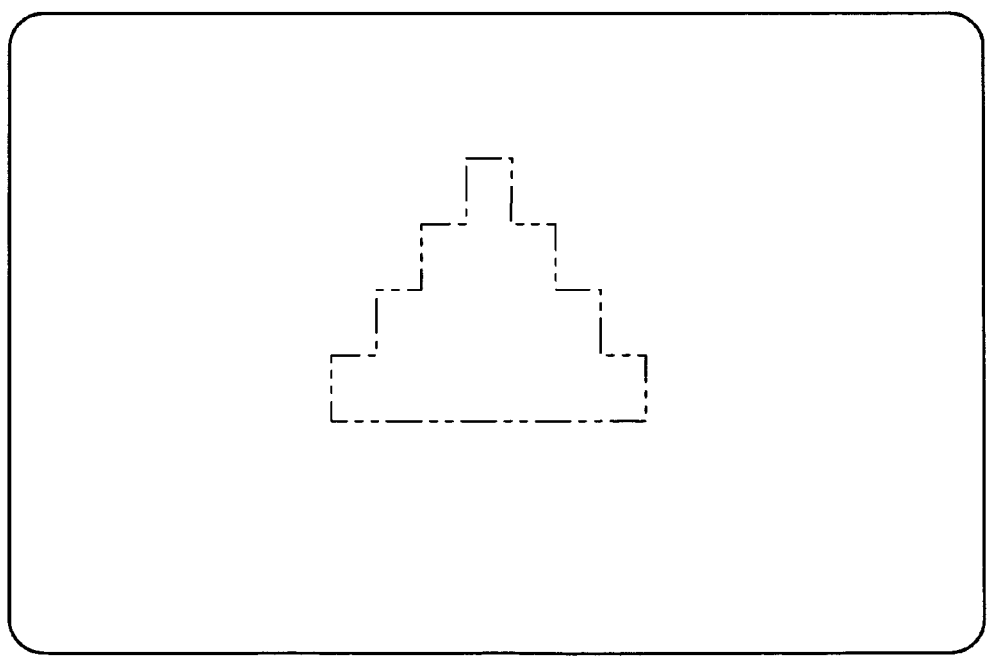
FIG. 32 is a diagram illustrating in general the image combination process performed using the time difference.
Figure 33:
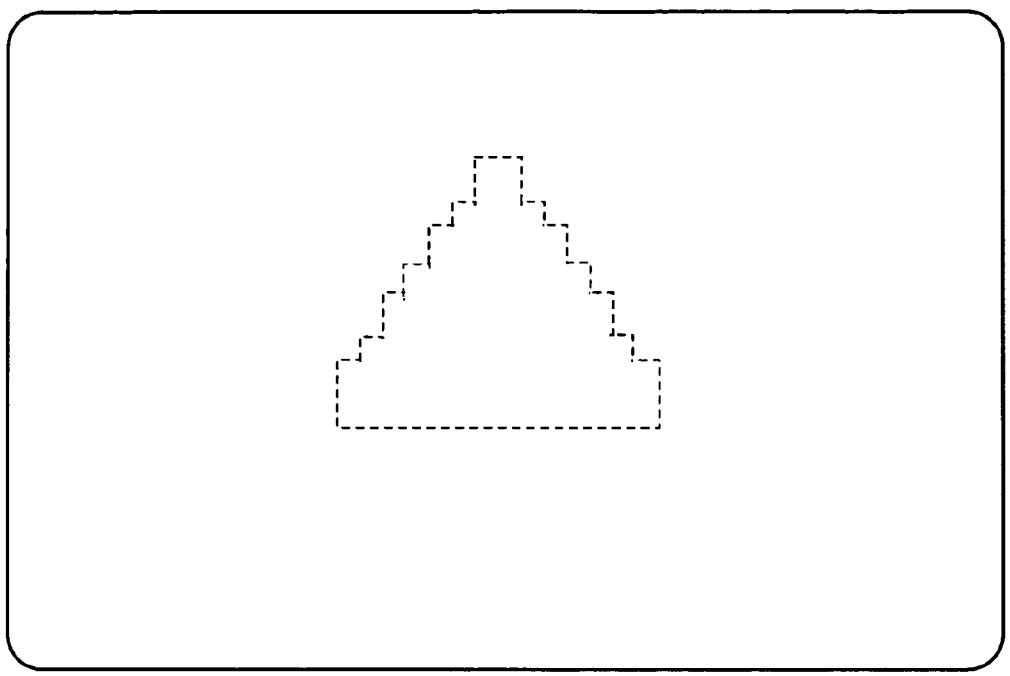
FIG. 33 is a diagram illustrating in general the image combination process performed using the time difference.
Figure 34:
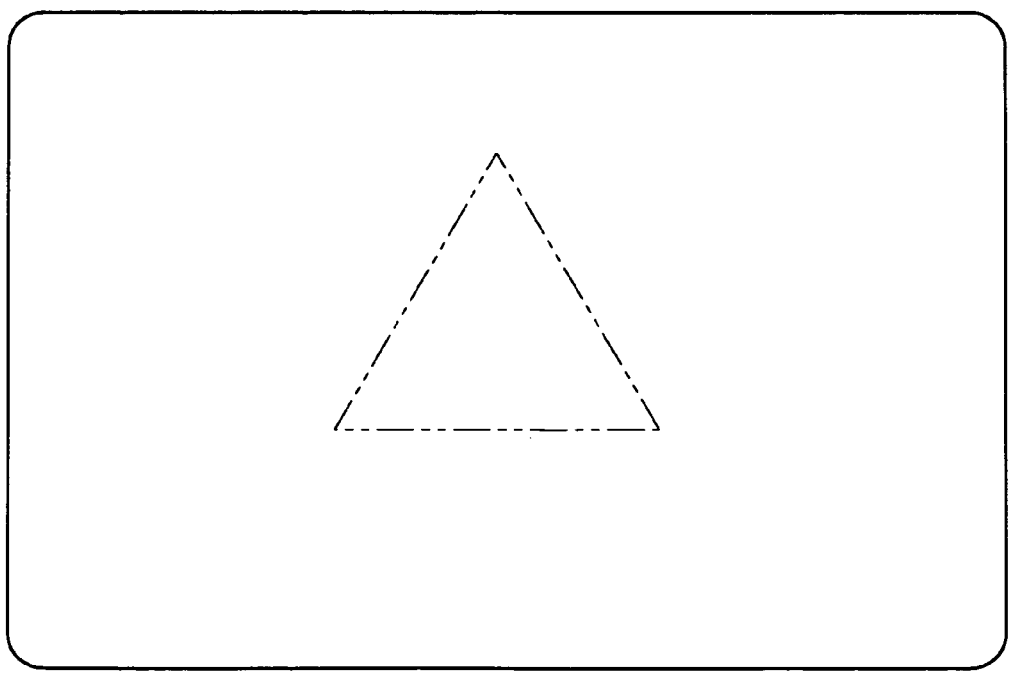
FIG. 34 is a diagram illustrating in general the image combination process performed using the time difference.
Figure 35:
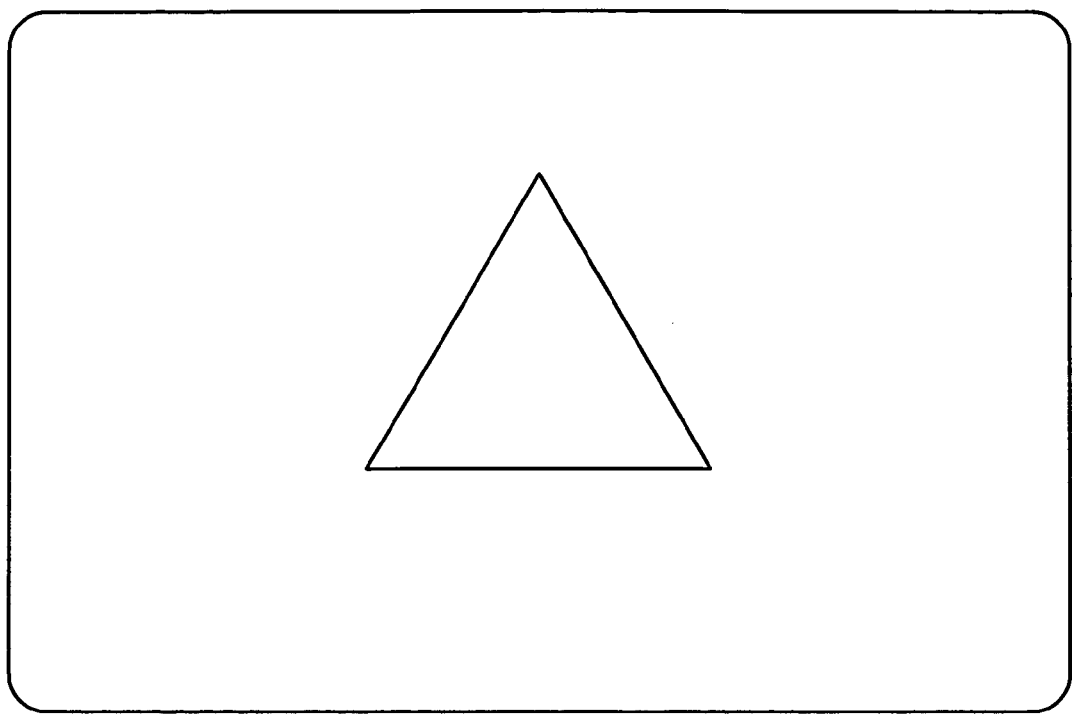
FIG. 35 is a diagram illustrating in general the image combination process performed using the time difference.

Moreover, after the process of disposing the blurred images is completed, the combination ratio may be changed. That is, after the blurred images have been superimposed on the reference image, the combination ratio of the blurred image to the reference image can be reduced. FIGS. 29 to 35 are diagrams illustrating an outline of this process. In this process, the blurred images are initially generated and disposed on the right and the left sides of the reference image as shown in FIG. 29. At this time, the combination process is performed in accordance with the initial value of the second timer. Subsequently, the blurred images are moved so as to approach the reference image in accordance with the values of the first timer as shown in FIGS. 30 to 32. When the first timer reaches zero, that is, when the blurred images are disposed at the position of the reference image as shown in FIG. 32, the decrement of the second timer is started such that the combination ratio is gradually changed as described above as shown in FIGS. 33 to 35. Thus, the image can be represented on the game screen such that the blurred images are gradually merged into one image as time passes, and thereafter the blurred image gradually becomes distinctly visible.

In the aforementioned embodiment, the combination ratio of the blurred image to the reference image is eventually reduced to 0%. However, for example, when the combination ratio is reduced to 10%, the focus adjustment process can be ended. For example, this is useful for representing, in the virtual game space, an effect obtained by the focus adjustment performed when the player character is in a poor visibility area due to fog or the like, that is, when the reference image itself is blurred.

Furthermore, only when a coordinate value of the sight point is substantially changed in a predetermined time period, the aforementioned focus adjustment process may be performed. That is, when the sight point is suddenly and substantially changed, the focus adjustment process may be performed. In this case, when the movement of the point of view is started, one of or all of an X coordinate point, a Y coordinate point and a Z coordinate point of the sight point are stored in a memory. At the same time, the counting of the number of frames is started. Following the process in step S3 shown in FIG. 23, that is, after the movement of the point of view is completed, determined are the number of frames and a change in coordinates of the sight point between before the movement of the point of view and after the movement of the point of view. When it is determined that at least one of the coordinate points is changed by a value greater than a predetermined value in a predetermined number of frames, that is, when the position of the sight point is substantially changed in a short time, the processes in and after step S4 are performed, that is, the processes relating to the focus adjustment are performed. In this case, the initial values of the shift width and the combination ratio may be determined in accordance with an amount of change of the coordinate point.

Figure 36:
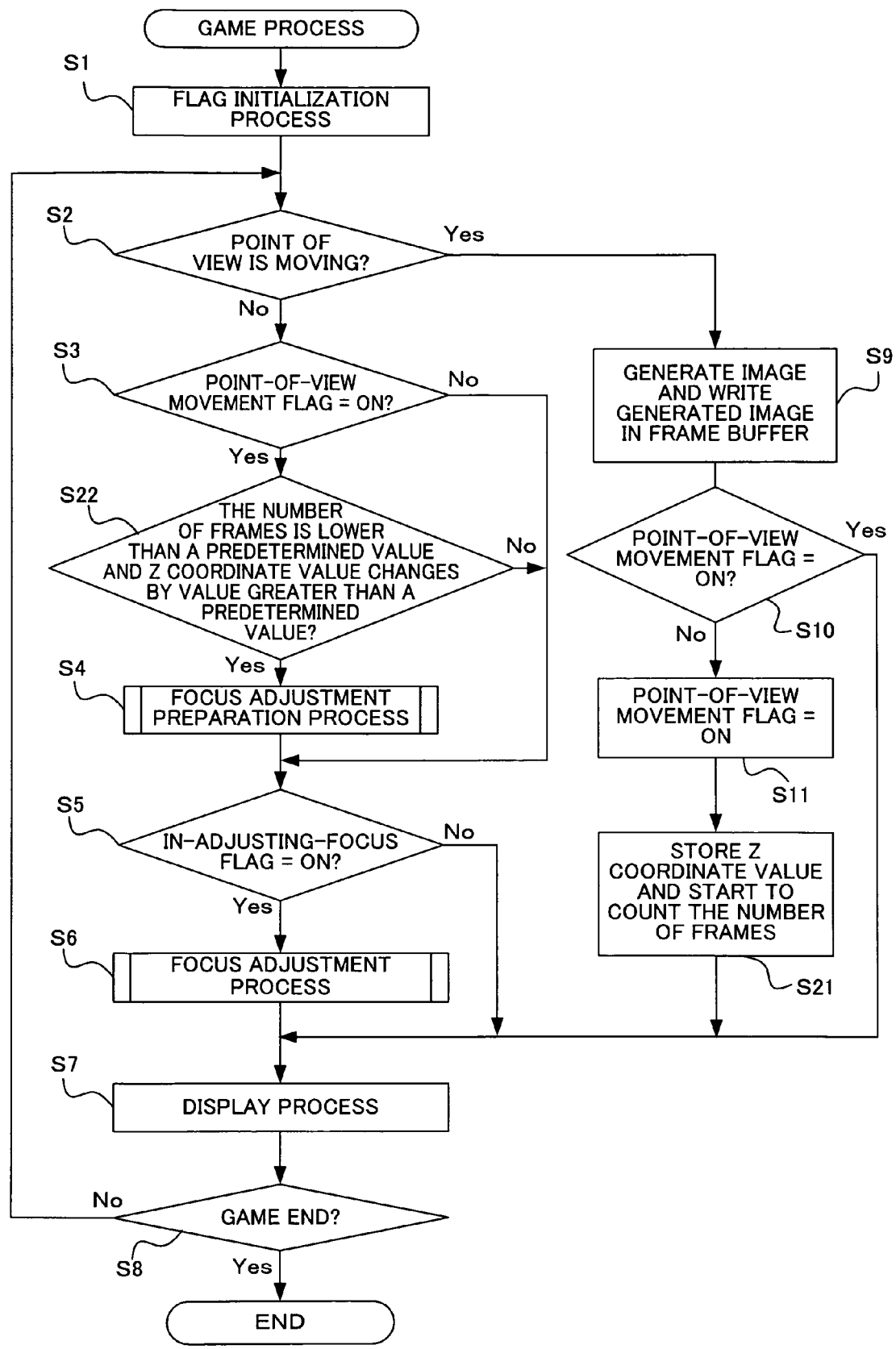
FIG. 36 is a flow chart illustrating a game process in which the focus adjustment is performed when a Z coordinate value is changed.
Figure 37:
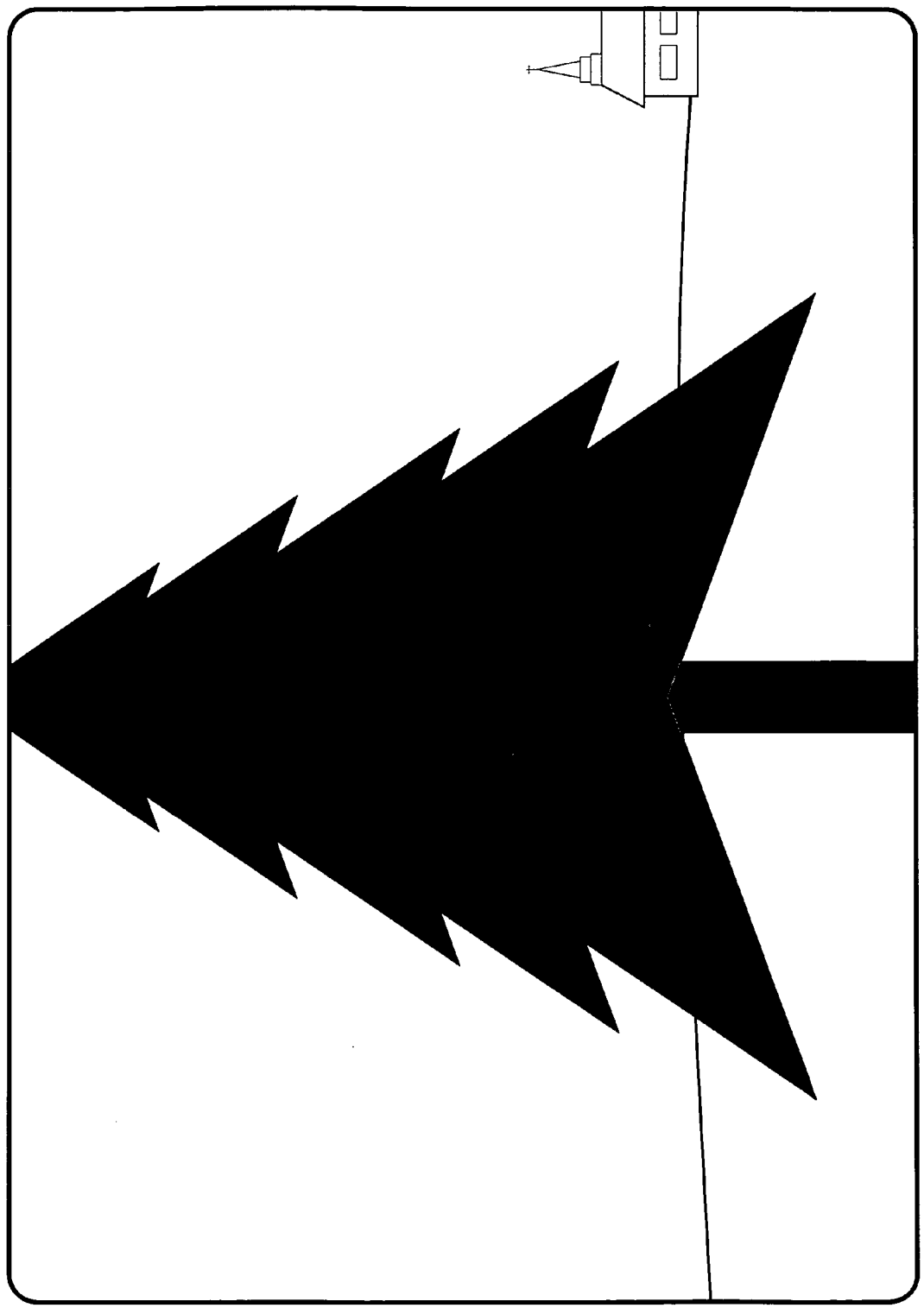
FIG. 37 is a diagram illustrating an example of a game screen on which the focus adjustment is performed when the Z coordinate value is changed.
Figure 38:
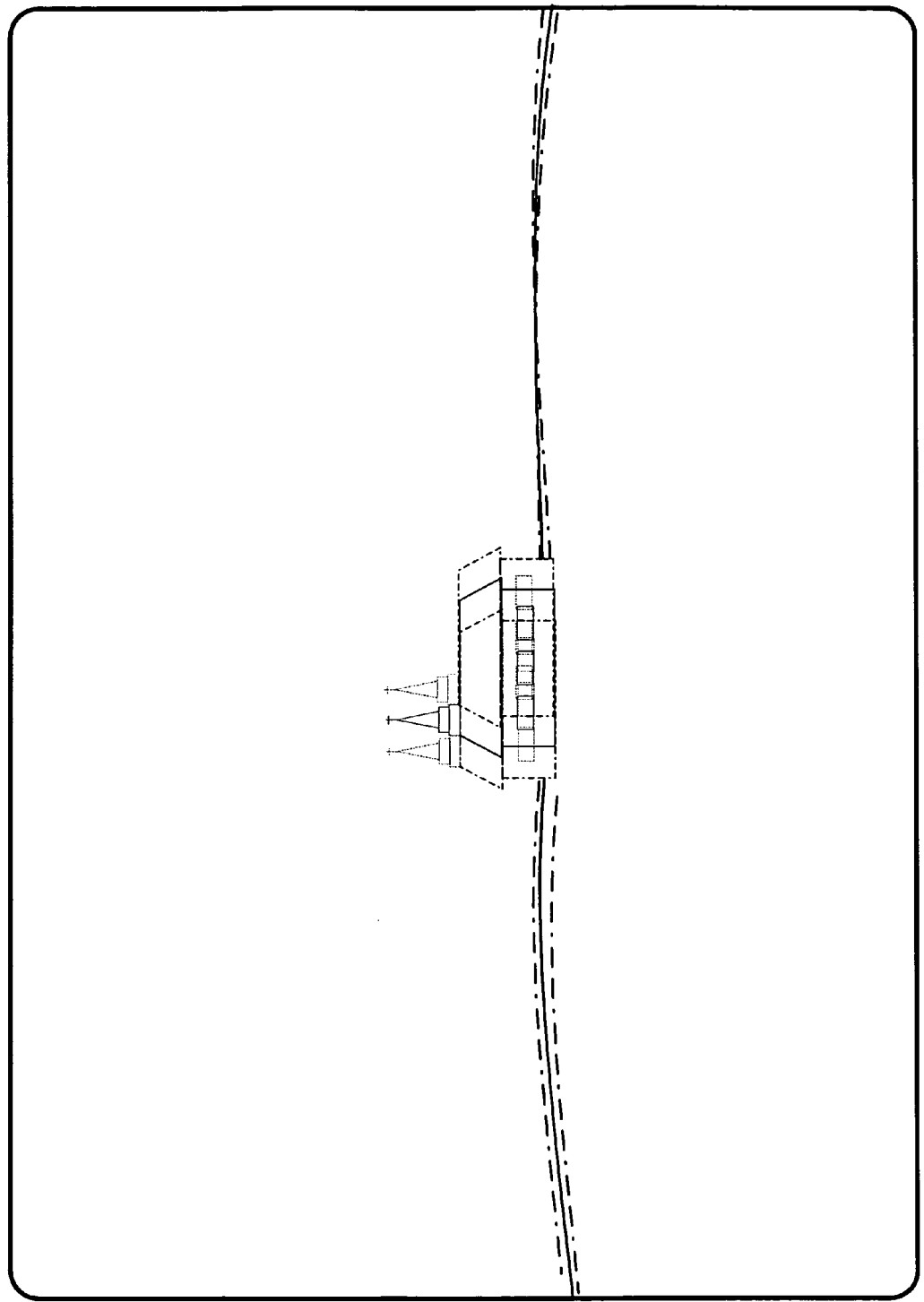
FIG. 38 is a diagram illustrating an example of the game screen on which the focus adjustment is performed when the Z coordinate value is changed.

Hereinafter, the focus adjustment process performed when a Z coordinate point is changed, e.g., a process performed when the player character looking at a nearby area suddenly looks in the distance, will be described. FIG. 36 is a flow chart illustrating a game process in which a focus adjustment is performed when a Z coordinate point is changed. The process shown in FIG. 36 is the same as the process shown in FIG. 23 except that the process shown in FIG. 36 includes steps S21 and S22, which are not performed in the process shown in FIG. 23. Following step S11, that is, when the movement of the point of view is started, a Z coordinate value is stored in a memory and the counting of the number of frames is started in step S21. Following the process in step S3 shown in FIG. 23, that is, after the movement of the point of view is completed (Yes in step S3), the number of frames and a change in the Z coordinate value are determined in step S22. When it is determined that the Z coordinate value is changed by a value grater than a predetermined value in a predetermined number of frames, that is, when it is determined that the Z coordinate value is substantially changed in a short time (Yes in step S22), the initial values of the shift width and the combination ratio are determined in accordance with an amount of change in the Z coordinate value, and processes in and after step S4, i.e., the processes relating to the focus adjustment are performed. On the other hand, when it is determined that the Z coordinate value is not changed by a value greater than the predetermined value in the predetermined number of frames, that is, when it is determined that the Z coordinate value is not substantially changed (No in step S22), the process relating to the focus adjustment is not performed. In the aforementioned process, when a player looking at a nearby area suddenly looks in the distance in the virtual space, the aforementioned focus adjustment process is performed, so that the human eyes' characteristics that the human eyes cannot be quickly focused can be effectively represented in the game. FIGS. 37 and 38 are diagrams illustrating an example of a game screen on which the player character having been looking at a nearby area focuses its eyes into the distance. In FIG. 37, the sight point is focused on a tree on the front side. In this state, when the point of view is changed such that the sight point is focused on a house in the distance, a blurred image is displayed as shown in FIG. 38. Needless to say, the same process can be performed when the player character looking in the distance suddenly looks at a nearby area. Thus, the human eyes' characteristics can be represented in the game with enhanced reality.

Furthermore, the shift width, the initial values of the timers, the decrements of the timers and the initial value of the combination ratio may be determined in accordance with a change in video between before the change of the sight point and after the change of the sight point. For example, when the player character looking at a bright area suddenly looks at a dark area, the change in brightness between before the change of the sight point and after the change of the sight point is calculated based on a brightness of each pixel. Alternatively, the sudden change in video occurring, for example, when the player character looking at a mountain suddenly looks at a town, is calculated based on a color distribution, a color histogram and the like. For example, a color histogram waveform obtained before the change of the sight point is compared with a color histogram waveform obtained after the change of the sight point, so as to calculate an amount of the change. The initial values of the shift width and the like are determined in accordance with the calculated amount of change, and thereafter the processes in and after step S4 may be performed. For example, when the player character suddenly goes out to a bright plain from a dark cave, the initial values of the timers and the shift width are set to greater values as compared to a case where the sight point is moved such that the player character looking at a nearby area in the plain suddenly looks in the distance in the same plain. Thus, in the focus adjustment process, a time period required for completing the focus operation, and the like can be changed in accordance with the game content and the progress in the game, so that the game having enhanced reality can be provided.

Figure 39:
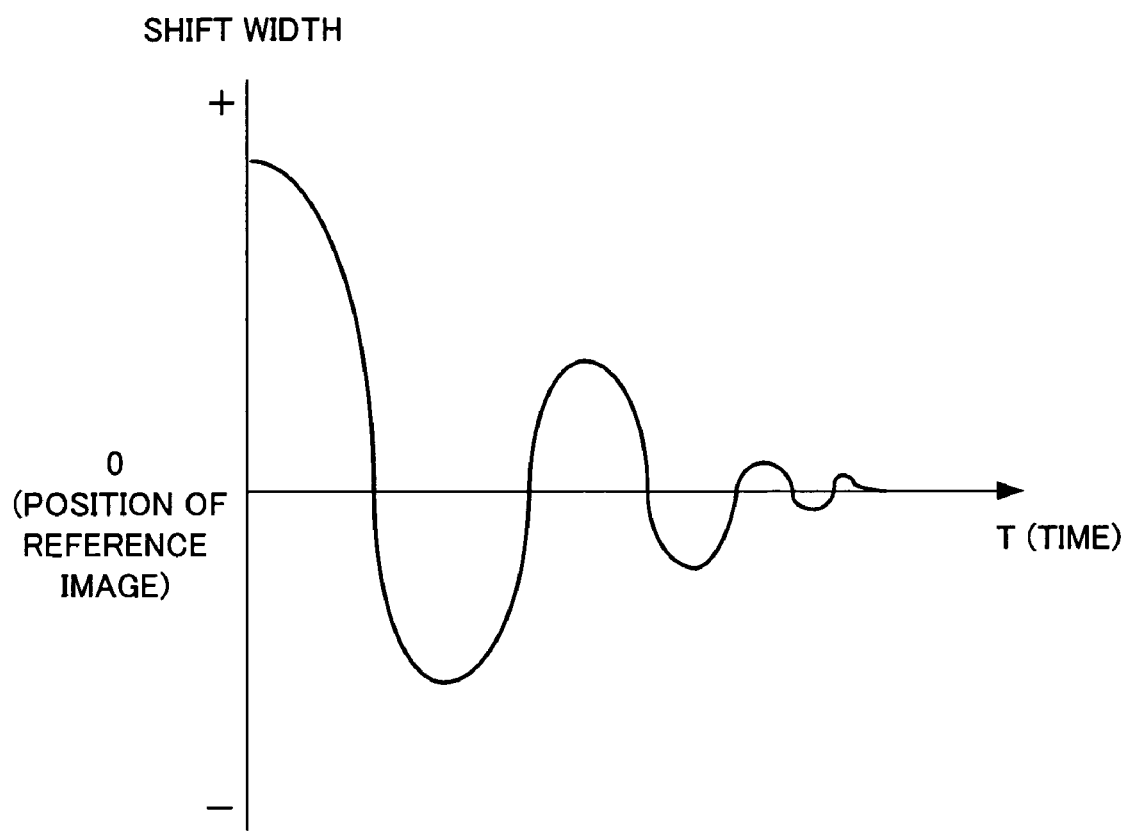
FIG. 39 is a graph illustrating an example where a shift width is attenuated so as to vibrate a shifted image.

Further, although in the aforementioned embodiment the shift width is determined in step S43 such that the distance between the reference image and each of the shifted images is simply reduced in accordance with the first timer being decremented. However, the shift width can be determined such that the shifted images vibrate in the same manner as a pendulum until the shifted images are superimposed on the reference image. Specifically, the shift width may be determined for each of the shifted images such that each of the shifted images vibrates and the vibration is attenuated while the value of the first timer is being reduced toward zero. FIG. 39 is a graph illustrating an example where the calculated shift width is changed in the aforementioned manner. In FIG. 39, a horizontal axis represents time t. When the shift width has a positive value, the shifted image vibrates so as to be disposed on the left side of the reference image. When the shift width has a negative value, the shifted image vibrates so as to be disposed on the right side of the reference image. As shown in FIG. 39, the shift width, which is initially calculated as a positive value, changes between a positive value and a negative value so as to be gradually attenuated to zero. That is, the shift width is gradually attenuated such that each time the shift width has a value "0", the direction in which the shifted image is displaced is reversed. In other words, the direction in which the shifted image is displaced when its shift width has a positive value is opposite to the direction in which the same shifted image is displaced when its shift width has a negative value. Thus, the shift width is calculated not only such that the shifted images simply approach the reference image involving no vibration so as to be superimposed on the reference image, but also such that the shifted images being vibrating approach the reference image so as to gradually attenuate the vibration to zero. Therefore, the human eyes' characteristics that the blurred image gradually becomes distinctly visible can be represented with enhanced reality.

While the invention has been described in detail, the foregoing description is in all aspects illustrative and not restrictive. It is understood that numerous other modifications and variations can be devised without departing from the scope of the invention.

What is claimed is:

1. A non-transitory storage medium having stored thereon a game program for generating a game image representing a state of a virtual world at intervals of a unit time and sequentially displaying the generated image on a display device, the game program causing a computer to execute:
   storing, as a reference image, an image generated at a predetermined time;
   setting a shift width which is gradually reduced to zero as a time passes from the predetermined time;
   generating, using the reference image, images to be combined;
   repeatedly generating a combined image by combining the reference image having been stored with the images to be combined, which are displaced by the shift width from the reference image having been stored, until the shift width is reduced to zero; and
   generating the game image containing the combined image at intervals of the unit time.

2. A non-transitory storage medium having stored thereon a game program for generating a game image representing a state of a virtual world at intervals of a unit time and sequentially displaying the generated image on a display device, the game program causing a computer to execute:
   storing, as a reference image, an image generated at a predetermined time;

setting a combination ratio which is gradually reduced to zero as a time passes from the predetermined time;

generating, using the reference image, images to be combined;

repeatedly generating a combined image by combining the reference image having been stored with the images to be combined at the combination ratio, until the combination ratio is reduced to zero; and generating the game image containing the combined image at intervals of the unit time.

3. The non-transitory storage medium according to claim 1, wherein the game program is operable to generate, as the game image representing the virtual world, a three-dimensional image seen from a virtual camera which is set in a three-dimensional virtual world having three-dimensional objects disposed therein, and an image generated when at least one of a movement of the virtual camera in the virtual world and a rotation thereof is stopped is stored as the reference image.

4. The non-transitory storage medium according to claim 3, wherein the game program causes the computer to execute calculating a moving distance over which a sight point of the virtual camera is moved in a predetermined time period, and setting one of an initial value of the shift width and an initial value of the combination ratio in accordance with the moving distance having been calculated.

5. The non-transitory storage medium according to claim 4, wherein the moving distance represents a distance over which the sight point is moved along a line of sight of the virtual camera.

6. The non-transitory storage medium according to claim 3, wherein the game program causes the computer to further execute accepting an operation of changing at least one of the movement of the virtual camera in the virtual world and the rotation thereof, and an image generated when the virtual camera is stopped after the operation is accepted is stored as the reference image.

7. The non-transitory storage medium according to claim 3, wherein the game program causes the computer to further execute calculating a moving distance over which a sight point of the virtual camera is moved in a predetermined time period, and the reference image is stored when the moving distance having been calculated has a value greater than a predetermined value.

8. The non-transitory storage medium according to claim 7, wherein the moving distance represents a distance over which the sight point is moved along a line of sight of the virtual camera.

9. The non-transitory storage medium according to claim 1, wherein the images identical to the reference image are generated as the images to be combined.

10. The non-transitory storage medium according to claim 1, wherein blurred images are generated as the images to be combined by blurring the reference image.

11. The non-transitory storage medium according to claim 1, wherein the reference image is rendered in a rendering memory and at least two blurred images of a first blurred image and a second blurred image are generated as the images to be combined by blurring the reference image, the game program causes the computer to further execute:

calculating a first position which is offset by the shift width from the reference image having been rendered in the rendering memory;

calculating a second position which is offset by the shift width from the reference image having been rendered in the rendering memory in a direction different from a direction of the first position; and combining, with the reference image, the first blurred image disposed at the first position and the second blurred image disposed at the second position so as to generate the combined image.

12. The non-transitory storage medium according to claim 1, wherein an initial value of the shift width is set in accordance with an environmental parameter for determining an environment of the virtual world.

13. The non-transitory storage medium according to claim 1, wherein the virtual world contains a player character operable by a player using an operation device, and an initial value of the shift width is set in accordance with a parameter for determining a state of the player character.

14. The non-transitory storage medium according to claim 1, wherein values of the shift width are determined such that the images-to-be-combined are vibrated so as to be eventually superimposed on the reference image as time passes.

15. The non-transitory storage medium according to claim 1, wherein the game program causes the computer to further execute reading the shift width having been preset, and reducing, at intervals of the unit time, the shift width having been read toward zero.

16. The non-transitory storage medium according to claim 1, wherein the game program causes the computer to further execute setting a combination ratio in accordance with a value of the shift width, and the reference image is combined with the images to be combined at the combination ratio.

17. A game apparatus for generating a game image representing a state of a virtual world at intervals of a unit time and sequentially displaying the generated image on a display device, the game apparatus comprising:

a processor; and a memory coupled to said processor, said memory storing instructions that, when executed by said processor, control said processor to:

store, as a reference image, an image generated at a predetermined time;

set a shift width which is gradually reduced to zero as a time passes from the predetermined time;

generate, using the reference image, images to be combined;

repeatedly generate a combined image by combining the reference image having been stored with the images to be combined, which are displaced by the shift width from the reference image having been stored, until the shift width is reduced to zero; and generate the game image containing the combined image at intervals of the unit time.

18. A game apparatus for generating a game image representing a state of a virtual world at intervals of a unit time and sequentially displaying the generated image on a display device, the game apparatus comprising:

a processor; and a memory coupled to said processor, said memory storing instructions that, when executed by said processor, control said processor to:
store, as a reference image, an image generated at a predetermined time;
set a combination ratio which is gradually reduced to zero as a time passes from the predetermined time;
generate, using the reference image, images to be combined;
repeatedly generate a combined image by combining the reference image having been stored with the images to be combined at the combination ratio, until the combination ratio is reduced to zero; and
generate the game image containing the combined image at intervals of the unit time.

19. The non-transitory storage medium according to claim 2, wherein
the game program is operable to generate, as the game image representing the virtual world, a three-dimensional image seen from a virtual camera which is set in a three-dimensional virtual world having three-dimensional objects disposed therein, and
an image generated when at least one of a movement of the virtual camera in the virtual world and a rotation thereof is stopped is stored as the reference image.

20. The non-transitory storage medium according to claim 2, wherein blurred images are generated as the images to be combined by blurring the reference image.

21. A method for generating a game image representing a state of a virtual world at intervals of a unit time and sequentially displaying the generated image on a display device of a game apparatus, comprising:
storing an image generated at a predetermined time in a storage unit as a reference image;
setting a shift width which is gradually reduced to zero as a time passes from the predetermined time;
generating, using the reference image, images to be combined;
repeatedly generating a combined image by combining the reference image having been stored with the images to be combined, which are displaced by the shift width from the reference image having been stored, until the shift width is reduced to zero; and
generating the game image containing the combined image at intervals of the unit time on the display device of the game apparatus.

22. A system for generating a game image representing a state of a virtual world at intervals of a unit time and sequentially displaying the generated image on a display device, the system comprising:
a processing system including one or more processors, the processing system configured to:
store, as a reference image, an image generated at a predetermined time;
set a shift width which is gradually reduced to zero as a time passes from the predetermined time;
generate, using the reference image, images to be combined;
repeatedly generate a combined image by combining the reference image having been stored with the images to be combined, which are displaced by the shift width from the reference image having been stored, until the shift width is reduced to zero; and
generate the game image containing the combined image at intervals of the unit time.

23. A method for generating a game image representing a state of a virtual world at intervals of a unit time and sequentially displaying the generated image on a display device of a game apparatus, the method comprising:
storing an image generated at a predetermined time in a memory of the game apparatus as a reference image;
setting a combination ratio which is gradually reduced to zero as a time passes from the predetermined time;
generating, using the reference image, images to be combined;
repeatedly generating a combined image by combining the reference image having been stored with the images to be combined at the combination ratio, until the combination ratio is reduced to zero; and
generating the game image containing the combined image at intervals of the unit time on the display device of the game apparatus.

24. A system for generating a game image representing a state of a virtual world at intervals of a unit time and sequentially displaying the generated image on a display device, the system comprising:
a processing system including one or more processors, the processing system configured to:
store, as a reference image, an image generated at a predetermined time;
set a combination ratio which is gradually reduced to zero as a time passes from the predetermined time;
generate, using the reference image, images to be combined;
repeatedly generate a combined image by combining the reference image having been stored with the images to be combined at the combination ratio, until the combination ratio is reduced to zero; and
generate the game image containing the combined image at intervals of the unit time.

* * * * *